US012688128B2

(12) United States Patent
Gabbai et al.

(10) Patent No.: US 12,688,128 B2
(45) Date of Patent: Jul. 21, 2026

(54) DYNAMICALY ADJUSTED CACHE POLICY AND COMPRESSION SCHEME FOR GRAPHS PROCESSED BY GRAPH NEURAL NETWORKS

(71) Applicant: Intel Corporation, Santa Clara, CA (US)

(72) Inventors: Ronen Gabbai, Santa Clara, CA (US); Amit Bleiweiss, Yad Binyamin (IL); Ohad Falik, Kfar Saba (IL); Amit Gur, Ein-Vered (IL); Almog Tzabary, Kfar Saba (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/734,994

(22) Filed: May 2, 2022

(65) Prior Publication Data

US 2022/0261357 A1     Aug. 18, 2022

(51) Int. Cl.
| | |
|---|---|
| *G06F 12/12* | (2016.01) |
| *G06F 12/0891* | (2016.01) |
| *G06F 12/126* | (2016.01) |
| *G06F 12/128* | (2016.01) |
| *G06F 18/214* | (2023.01) |

(52) U.S. Cl.
CPC ........ *G06F 12/128* (2013.01); *G06F 12/0891* (2013.01); *G06F 12/126* (2013.01); *G06F 18/214* (2023.01); *G06F 2212/1021* (2013.01)

(58) Field of Classification Search
CPC ........ G06F 12/08; G06F 12/12; G06F 12/126; G06F 12/0891; G06F 12/0866; G06F 12/128; G06F 18/214; G06F 12/122; G06F 2212/1021
See application file for complete search history.

(56) References Cited

U.S. PATENT DOCUMENTS

| | | | | |
|---|---|---|---|---|
| 11,275,987 | B1 * | 3/2022 | Gottin | G06F 3/0634 |
| 2021/0117808 | A1 * | 4/2021 | Gottin | G06N 5/04 |

(Continued)

OTHER PUBLICATIONS

J. Hou, H. Xia, H. Lu and A. Nayak, "A GNN-based Approach to Optimize Cache Hit Ratio in NDN Networks," 2021 IEEE Global Communications Conference (GLOBECOM), Madrid, Spain, 2021, pp. 1-6.*

(Continued)

*Primary Examiner* — Pierre Michel Bataille
(74) *Attorney, Agent, or Firm* — Nicholson De Vos Webster & Elliott LLP

(57) ABSTRACT

Systems, apparatuses, and methods include technology that determines, with a neural network, that a first eviction node stored in a cache will be evicted from the cache based on a cache policy. The first eviction node is part of a plurality of nodes associated with a graph. Further, a subset of nodes of the plurality of nodes remains in the cache after the eviction of the first eviction node from the cache. The technology further tracks a number of cache hits on the cache during an aggregation operation associated with a hardware accelerator, where the aggregation operation is executed on the subset of nodes that remain in the cache after the eviction of the eviction node from the cache. The technology executes a training process on the neural network to adjust the cache policy based on the number of the cache hits.

25 Claims, 13 Drawing Sheets

(56) References Cited

U.S. PATENT DOCUMENTS

| | | | |
|---|---|---|---|
| 2021/0149805 A1* | 5/2021 | Pinho ................. | G06F 12/0862 |
| 2021/0157743 A1* | 5/2021 | Chandrasekaran .......................... | |
| | | | G06F 12/0897 |
| 2021/0374523 A1* | 12/2021 | Gottin .................... | G06N 3/088 |
| 2023/0236977 A1* | 7/2023 | Dev .................... | G06F 12/0891 |
| | | | 711/118 |
| 2023/0315630 A1* | 10/2023 | Alam ................. | G06F 12/0804 |
| | | | 711/122 |
| 2024/0241833 A1* | 7/2024 | Narayanan ............ | G06F 12/123 |
| 2025/0156326 A1* | 5/2025 | Pandey .............. | G06F 12/0806 |

OTHER PUBLICATIONS

A. Addisie and V. Bertacco, "Collaborative Accelerators for Stream-lining MapReduce on Scale-up Machines With Incremental Data Aggregation," in IEEE Transactions on Computers, vol. 69, No. 8, pp. 1233-1247, Aug. 1, 2020.*

J. Hou, H. Xia, H. Lu and A. Nayak, "A Graph Neural Network Approach for Caching Performance Optimization in NDN Net-works," in IEEE Access, vol. 10, pp. 112657-112668, 2022.*

S. Sethumurugan, J. Yin and J. Sartori, "Designing a Cost-Effective Cache Replacement Policy using Machine Learning," 2021 IEEE International Symposium on High-Performance Computer Archi-tecture (HPCA), Seoul, Korea (South), 2021, pp. 291-303.*

\* cited by examiner

300

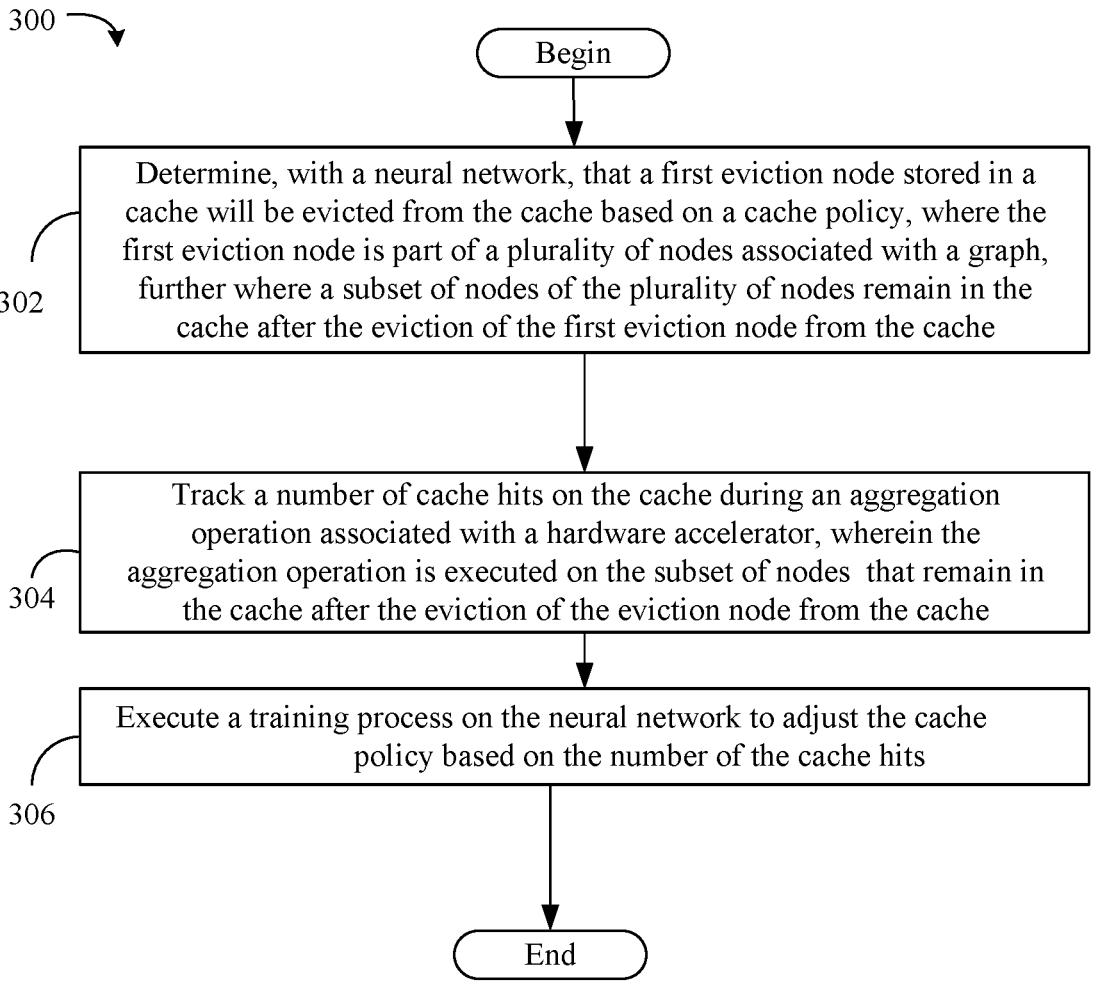

Begin

Determine, with a neural network, that a first eviction node stored in a cache will be evicted from the cache based on a cache policy, where the first eviction node is part of a plurality of nodes associated with a graph, further where a subset of nodes of the plurality of nodes remain in the cache after the eviction of the first eviction node from the cache

302

Track a number of cache hits on the cache during an aggregation operation associated with a hardware accelerator, wherein the aggregation operation is executed on the subset of nodes that remain in the cache after the eviction of the eviction node from the cache

304

Execute a training process on the neural network to adjust the cache policy based on the number of the cache hits

306

End

FIG. 2

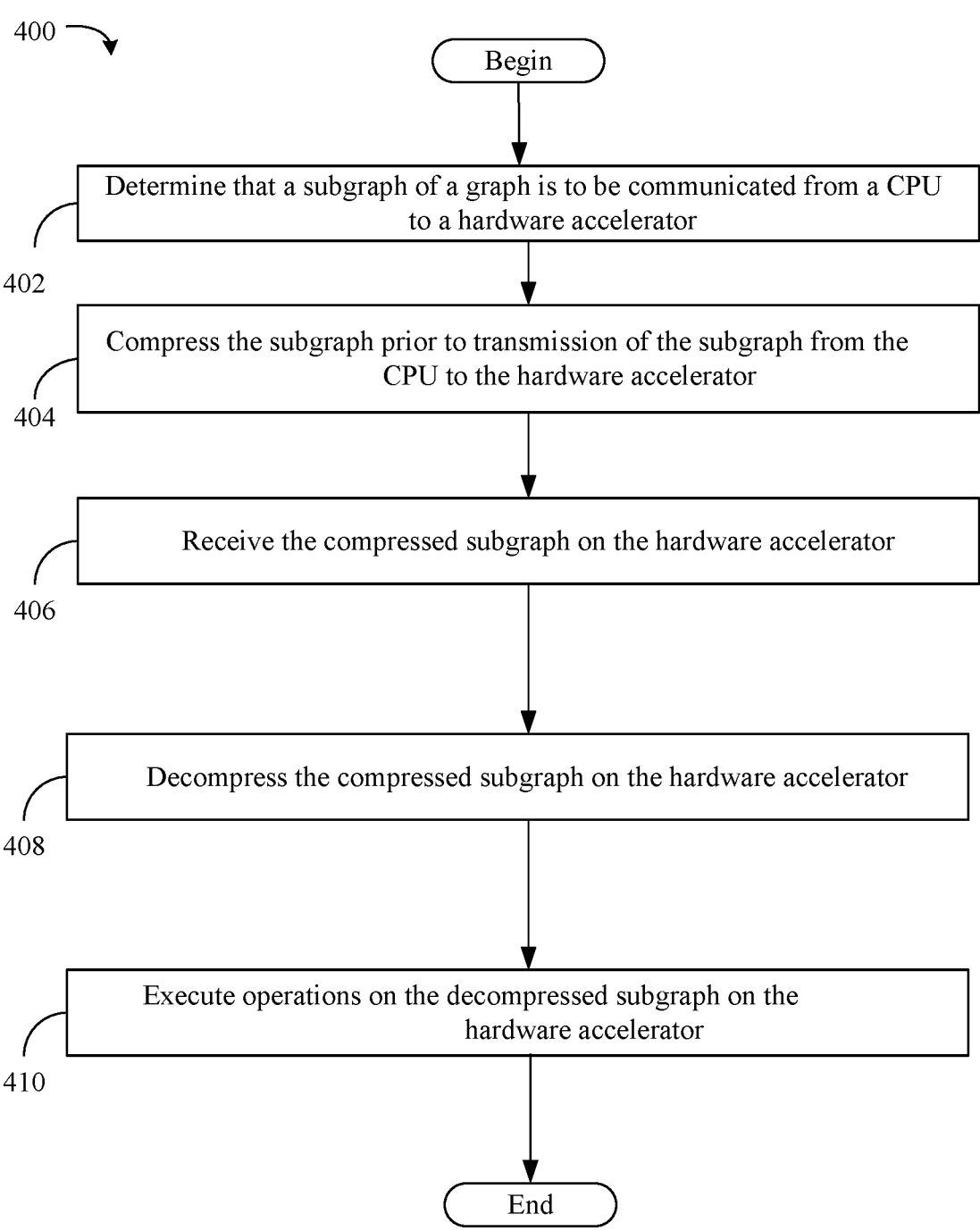

400

Begin

Determine that a subgraph of a graph is to be communicated from a CPU to a hardware accelerator

402

Compress the subgraph prior to transmission of the subgraph from the CPU to the hardware accelerator

404

Receive the compressed subgraph on the hardware accelerator

406

Decompress the compressed subgraph on the hardware accelerator

408

Execute operations on the decompressed subgraph on the hardware accelerator

410

End

DYNAMICALY ADJUSTED CACHE POLICY AND COMPRESSION SCHEME FOR GRAPHS PROCESSED BY GRAPH NEURAL NETWORKS

TECHNICAL FIELD

Embodiments generally relate to graph neural networks (GNNs). More particularly, embodiments relate to a dynamically adjustable cache policy and compression scheme that is optimized for graphs associated with graph neural networks (GNNs).

BACKGROUND

GNNs are neural networks that operate on graphs as inputs. The graphs may be of a significant size numbering in thousands and potentially millions of interconnected nodes. GNNs have gained popularity in recent years, and are deployed in various social, entertainment and e-commerce platforms. During operation, the graphs may be loaded into various levels of storage (e.g., cache, long-term storage, etc.) to facilitate processing. Graphs cannot be stored entirely in some levels of storage (e.g., the cache) due to size constraints. Therefore, portions of the graphs (e.g., subgraphs) are stored in the levels of storage. Given the size of the graphs, selecting which nodes are stored as part of the subgraphs and evicted from the levels of storage is complex and challenging. Furthermore, communicating the subgraphs from a host processor to a hardware accelerator that will process the subgraphs may consume significant bandwidth and power.

BRIEF DESCRIPTION OF THE DRAWINGS

The various advantages of the embodiments will become apparent to one skilled in the art by reading the following specification and appended claims, and by referencing the following drawings, in which:

FIG. 2 is a flowchart of an example of a method of generating a cache policy for GNN processing according to an embodiment;

FIG. 9 is a flowchart of an example of a method of compressing a subgraph according to an embodiment;

DESCRIPTION OF EMBODIMENTS

Graphs will follow the power law which states that a small fraction of the nodes are highly connected, while the majority of nodes have a small, connected neighborhood of neighboring nodes. As such, relying solely on standard and static cache policies (e.g., least recently used (LRU), frequently used (LFU), etc.) may not be optimal for graphs of GNNs. Such a static cache policy will lead to thrashing since most of the nodes will be replaced often due to the power law discussed above. Embodiments herein generate an optimal and dynamically adjustable cache policy that addresses the aforementioned by continuously adapting the cache policy. In detail, embodiments learn the cache behavior for a specific graph over time and through training (e.g., reinforcement learning). Embodiments herein significantly improve GNN training time while leading to less thrashing during operation.

That is, embodiments herein generate a cache policy optimal for a GNN, by continuously learning the patterns of the graph as the graph is processed by the GNN (e.g., during aggregation operations). The cache policy is fine-tuned with a training scheme (e.g., reinforcement learning scheme), where the cache policy is improved as the cache policy is adjusted based on a reward. Doing so reduces thrashing within training batches and across batches when training on large graphs. Thus, some embodiments result in enhanced caching performance when applied to GNNs to significantly reduce overall training time for GNNs.

Moreover, the cache policy may be a hybrid mixture of several policies to yield optimal cache behavior for larger-sized graphs. Thus, embodiments use a reinforcement learning strategy to adapt to the graph input over time, and hence decide which eviction policy to utilize (e.g., when to use LRU or LFU). Reinforcement learning uses a reward based on identification of the node recurrence for a specific graph and builds an enhanced policy as more minibatches are processed.

Moreover, some embodiments compress the subgraphs to reduce communication overhead. For example, the subgraphs may be communicated from a host processor (e.g., a central processing unit) to a hardware accelerator which will processes the subgraphs. Compression of the subgraphs prior to transmission from the host processor to the hardware accelerator results in lower latency communications, reduced power consumption and reduced bandwidth.

Figure 1:
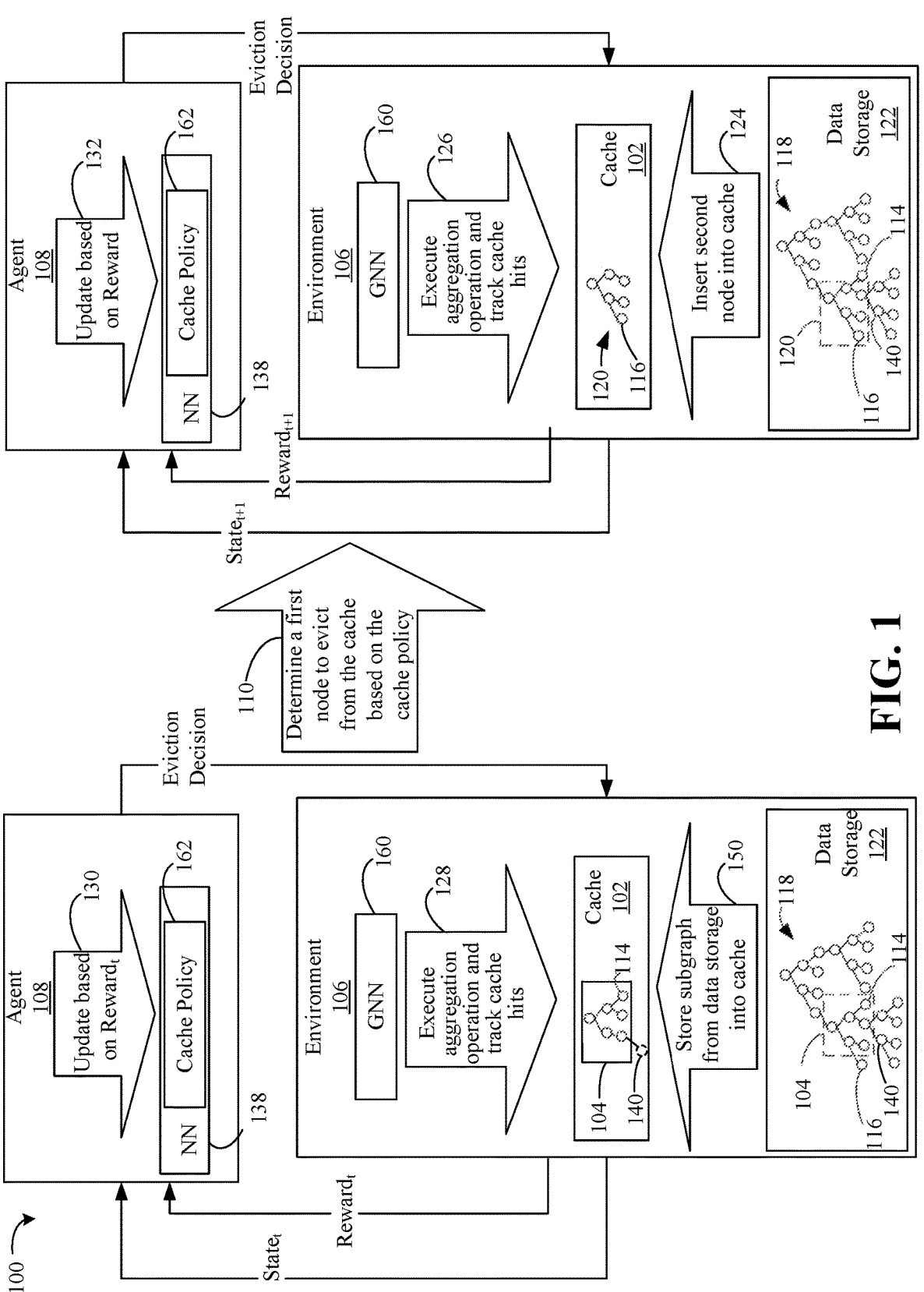
FIG. 1 is a process of an example of GNN training according to an embodiment.

Turning now to FIG. 1, a GNN training process 100 based on training (e.g., reinforcement learning) is illustrated. The examples below will reference reinforcement learning, but it will be understood that other training schemes may be similarly incorporated. An environment 106 includes a GNN 160 that accesses a cache 102 in order to train. The environment 106 further includes a data storage 122 that stores a graph 118. The cache 102 is unable to store the entire graph 118, and therefore only a portion of the graph 118 is able to be stored in the cache 102.

The GNN training process 100 trains a GNN 160. In GNN training process 100, the GNN 160 does not train on the entirety of the graph 118 at a same time. Rather the full graph 118 is sampled into minibatches with various sampling techniques (e.g., uniform sampling techniques and/or random walk sampling technique) to reduce training latency while reducing thrashing.

In this example, the GNN training process 100 samples a first subgraph 104 (e.g., subset of nodes) of the graph 118. The first subgraph 104 is retrieved from the data storage 122 (e.g., a long-term data storage) and stored into cache 102, 150. For example, an agent 108 (e.g., with a host processor thereof) may determine which nodes of the graph 118 to store in the cache 102. The agent 108 may provide instruction to the environment 106 to store the first subgraph 104 into the cache 102. For example, the cache 102 may be associated with a central processing unit (CPU) such that the CPU stores and retrieves data to and from cache 102. Furthermore, the first subgraph 104 may be compressed prior to retrieval from a long term data storage and storage into the cache 102 to reduce latency. Thus, the cache 102 stores the first subgraph 104. In this example, the agent 108 determines, with a neural network (NN) 138, that a first eviction node 140 (shown in dashed line) stored in the cache 102 is to be evicted from the cache 102 based on a cache policy 162. As illustrated, the first eviction node 140 is part of a plurality of nodes associated with the graph 118. Thus, the first eviction node 140 is removed from the cache 102 and does not constitute part of the first subgraph 104.

Each node of the first subgraph 104 occupies N cache lines of the cache 102, where N>1. Furthermore, the first subgraph 104 is a plurality of nodes associated with the graph 118. The agent 108 may also be responsible for generating eviction decisions (explained further below) to evict nodes from the cache 102. The environment 106 may implement the eviction decisions (e.g., with a CPU to execute eviction decisions).

The GNN 160 may execute an aggregation operation on the first subgraph 104. The GNN 160 may execute the aggregation operation with a hardware accelerator. In detail, the aggregation operation convolves neighboring nodes to convolve neighboring node samples. The aggregation operation may then generate an embedding for a particular node in focus. The aggregation operation may be a part of training the GNN 160. That is, the GNN 160 may follow a neighborhood aggregation strategy, where embodiments iteratively update the representation of each respective node of the graph 118 by aggregating representations of the respective node's neighbors. After k iterations of aggregation, the respective node's representation captures the structural information within its k-hop network neighborhood With graph 118, data points under consideration (e.g., nodes) do not have a constant number of neighbors and furthermore do not have a fixed ordering of these neighbors. The lack of constant number of neighbors poses a challenge for using a standard cache policy, and as such embodiments herein generate and implement a dynamically adjustable cache policy. Equation 1 below represents the aggregation function for node i, where is k is the hop level away from node i, and the summation term represents the transformation and aggregation that occurs on all neighboring nodes (e.g., 250 samples).

$$h_i^{k+1} = ReLU\left(W^{(k)}h_i^{(k)} \sum_{n=1}^{\infty} (ReLU(Q^{(k)}h_n^k))\right) \quad \text{Equation 1}$$

In order to generate the cache policy, the GNN 160 executes the aggregation operation following Equation 1, and the environment 106 tracks cache hits 128 during the aggregation operation. Each of the cache hits is a state in which aggregation data requested by a data request associated with the aggregation operation is stored in the cache 102 to bypass retrieval of the aggregation data from a data storage (e.g., a hard-disk or other storage). During the aggregation operation, the cache 102 is accessed until a first cache eviction occurs. The total number of cache hits until the first cache eviction are tracked. The environment 106 then generates a Reward$_t$ based on the cache hits, and a State$_t$ based on current characteristics of the cache 102. In some embodiments, the environment 106 may retrieve, with a host processor (e.g., a CPU), the first subgraph 104 (e.g., a subset of nodes) from the cache 102, compress, with the host processor, the first subgraph 104 (e.g., subset of nodes) to generate compressed nodes, receive, with a hardware accelerator that is to implement the GNN 160, the compressed nodes, and decompress, with the hardware accelerator, the compressed nodes to obtain the first subgraph 104 (e.g., the subset of nodes) and execute the aggregation operations. Doing so enables reduced communicational bandwidth and power enhancing operations.

Embodiments feed the cache 102 with accesses during a time period until the first cache eviction is required for a set of the cache 102. The number of cache hits are counted until the first cache eviction is scheduled to occur, and then the counting may cease. A higher number of cache hits in this time period indicates that 1) the agent 108 did not select to evict cache lines that were accessed during the aggregation, and 2) the agent 108 inserted a cache line that was accessed. A lower amount of cache hits during the time period may indicate that the agent 108 evicted a needed cache line and therefore made an improper decision.

Therefore, the environment 106 generates a number of cache hits that will be used to generate a Reward$_t$ for the agent 108. The environment 106 will generate a lower value for Reward$_t$ for a lower number of cache hits, and a generate a larger value for Reward$_t$ for a larger number of cache hits. Thus, Reward$_t$ may only be available to the agent 108 in the future. Thus, the environment 106 tracks a number of cache hits on the cache 102 during an aggregation operation (which may be associated with the hardware accelerator), where the aggregation operation is executed on the first subgraph 104 (e.g., a subset of nodes) of the graph 118 (e.g., a plurality of nodes) that remain in the cache 102 after the eviction of the first eviction node 140 from the cache 102.

The State$_t$ represents a state of each data block and/or cache line (node=N×cache lines) of the cache 102. The State$_t$ identifies for each respective cache line of the cache 102, a first number of accesses to the respective cache line during the aggregation operation, and a second number of accesses that were issued to the set after the respective cache line was last accessed during the aggregation operation. The State$_t$ may include software hints based on graph structure, such as incoming edges, outgoing edges and node hop distance for each cache line (e.g., each node). The State$_t$ may also include general software hints such a sampling technique (e.g., a random walk sampling, uniform sampling, etc.) that was employed to generate the first subgraph 104 from the graph 118. The State$_t$ may also include for each respective cache line of the cache lines, a number of previous accesses to the respective cache line, time from previous access to the respective cache line, an average time between accesses to the respective cache line, average time between accesses to the respective cache line, residency time of data in the respective cache line, and a node footprint in the respective cache line. In some examples, the State$_t$ identifies for each respective cache line of the cache lines of the cache 102, a first number of accesses to the respective cache line, and a second number of accesses that were issued to a set of the respective cache line after the respective cache line was last accessed.

The State$_t$ may also indicate that a cache miss occurred, and a node will need to be evicted from the cache 102. Thus, the agent 108 may be aware of the need to evict a node from the cache 102.

The sampling technique described above may include a random walk sampling, uniform sampling, etc. For example, in a uniform sampling technique, respective nodes in graph 118 samples the neighbors of the respective node using a uniform distribution. For a random walk sampling technique, the graph 118 is traversed in a random walk until a specific depth is reached. All nodes along the random walk are sampled. The degree and type of sampling may greatly affect training and inference. For example, sampling at 2 hop layers results in first sampling 10 immediate neighbors, then sampling 25 neighbors for each of those 10 neighbors (i.e., 250 samples). This sampling step is repeated for each node in a batch, so for a batch size of 512 there would be over 100,000 samples from all over the graph. Thus, training on such large amounts of samples will be facilitated by embodiments herein that effectively reduce cache misses.

Embodiments utilize a reinforcement learning framework where the State$_t$ is passed to the agent 108 from the environment 106, and the agent 108 then generates an action (e.g., eviction decision) based on the State$_t$. Thus, embodiments execute a reinforcement learning process on the NN 138 to adjust the cache policy 162 based on the number of the cache hits. That is, the environment 106 issues the Reward$_t$ (which corresponds to the cache hits) to the agent 108 to adjust the cache policy 162. The agent 108 updates the cache policy 162 based on the number of cache hits and/or the Reward$_t$.

The Reward$_t$ is an incentive to maximize the hit rate. For example, the agent 108 comprises NN 138 that effectively implements the cache policy 162 and selects nodes to evict and/or maintain within the cache 102. The agent 108 may update weights of the NN 138 based on the Reward$_t$ to increase cache hits. For examples, the weights are updated during NN 138 training phase.

Thus, the agent 108 updates the cache policy 162 based on the Reward$_t$ 130 (i.e., by updating weights). Several hyperparameters may dictate the training. For example, the hyperparameters include a batch size (e.g., how many experiences to use to calculate the loss/reward and update the weights), gamma (e.g., a hyperparameter of a Deep Q Network (DQN) algorithm which determines how to weight the Reward$_t$). Another hyperparameter is epsilon start, epsilon end and epsilon decay, which define the Epsilon Greedy Strategy used in the DQN algorithm, dictate to the agent the probability to randomly guess an action (instead of inferring one). Such hyperparameters are important because at the beginning of the training the agent has no knowledge at all, and thus a random guess may be beneficial. Over time the agent learns something meaningful, and so a random guess will occur less often. Controlling this speed of probability change is crucial. A last hyperparameter includes no eviction probability which determines the probability of which a random action should be replaced with a "no eviction" action.

The agent 108 then generates an eviction decision based on the State$_t$ and the cache policy 162. For example, the environment 106 may also indicate as part of the State$_t$, that a second node 116 is to be stored in the cache 102. The cache

102 may be full, and as such a node of the first subgraph 104 (which may be stored in several cache lines) may need to be evicted from the cache 102. Thus, the agent 108 may select a node to evict from the cache 102 based on the cache policy 162.

The cache policy 162 is an eviction policy that is used to evict data from the cache 102 and is implemented by the NN 138 (e.g., via input, hidden and output layers). As noted, the agent 108 feeds State$_t$ then feeds forward the State$_t$ to the NN 138 to generate an eviction decision. The eviction decision indicates a node to evict. The eviction decision may include a number representing a way of the cache 102 that should be evicted (i.e., the way contains the node to be evicted), and in some embodiments a cache line(s) within the way to evict. In some embodiments, if the number equals the number of ways, then the NN 138 selected "do not evict" (i.e., the action represents no eviction) and do not insert the new cache line into cache 102 (where the ways' indices are between 0 and N–1). Thus some embodiments provide an additional option for the agent 108, which is not to evict any way from cache 102 (i.e., not to insert the new cache line). This selection is specified by the total value of the number of ways (i.e., N) as any other selection between 0–(N–1) is the way number to evict. The agent 108 then communicates the eviction decision to the environment 106. The cache 102 then evicts the specific cache line that was selected by the agent 108 through the eviction decision.

Thus, the GNN training process 100 determines a first node 114 (e.g., a second eviction node) to evict from a cache line of the cache 102 based on the cache policy 162, 110 and the State$_t$. In this example, the NN 138 selected the first node 114 for eviction so that the second node 116 may be inserted into the cache 102. Thus, a second subgraph 120 is stored in the cache 102. The second subgraph 120 contain the same nodes as the first subgraph 104 except first node 114, and additionally contains the second node 116. The GNN training process 100 inserts the second node 116 into the cache 102, 124 and removes the first node 114.

The GNN 160 then executes an aggregation operation and tracks a number of cache hits 126 based on the second subgraph 120. The environment 106 may then generate a Reward$_{t+1}$ and a State$_{t+1}$ based on the aggregation operation on the second subgraph 120. The environment 106 may then provide a Reward$_{t+1}$ and a State$_{t+1}$ to the agent 108. The agent 108 updates the NN 138 based on the Reward$_{t+1}$ and generates an eviction decision based on the State$_{T+1}$.

The GNN training process 100 may iteratively continue as described above until the NN 138 is fully trained. When the NN 138 is deployed (e.g., to form eviction decisions for execute aggregation operations in the future), the NN 138 may generate eviction decisions based on the cache policy 162 and state updates. The NN 138 may not need to be trained during deployment so the reward may be bypassed.

In some embodiments, the cache 102 may be a simulation. For example, a computer may replicate the operations of the cache 102 in a software environment to generate the outcomes (e.g., cache hits or misses) based on the eviction decisions. In some embodiments, the cache 102 is a physical hardware component and the agent 108 is trained during deployment.

As noted above, the cache policy 162 may be a hybrid policy that may dynamically alternate between various schemes (e.g., a LFU scheme and LRU scheme). Doing so provides added flexibility and efficiency relative to conventional models that may inflexibly rely solely on one scheme. For example, a first scheme may be applied to graphs and/or caches under a certain size, while a second scheme may be applied to graphs and/or caches over the certain size. That is, applying only a LFU or LRU scheme may detrimentally affect performance as the LFU scheme or LRU scheme may not operate efficiently across all graph sizes and/or cache sizes. Moreover, such conventional models ignore the unique caching opportunities for GNNs or inefficiently reserve a portion of the cache for high-degree vertices. In the latter case where a portion of the cache is reserved for high-degree vertices, high-degree graphs require a large memory footprint during aggregation operations and as such the high-degree graphs may no longer fit on the on-chip memory or cache. The cache hit rate increases monotonically with the proportion (e.g., 0-100% of reserved cache), particularly for larger graphs. The main reason is that on-chip cache is too small relative to the large graphs and thus suffers frequent replacement when certain policies (e.g., LRU policy) is applied.

As minibatch sizes increase, recurrence grows and is particularly high in common minibatch sizes when training GNNs (e.g., greater than 512 nodes). As node recurrence is measured across minibatches, the percentage grows further. Despite the extremely high recurrence, fluctuations of data occur within the Aggregate layer. Hence, conventional designs employing only an LRU scheme will perform badly, as the conventional design will discard the least recently used items first, although they could reappear again at a later point in time.

LFU based on node importance information may operate with better efficiency. LFU may use a counter to keep track of the number of times a block is referenced in memory. When the cache is full and requires more room, the system will purge the item with the lowest reference frequency. On the other hand, conventional designs employing only a LFU scheme could operate with inefficiency (e.g., break) if a set of neighboring nodes are referenced repeatedly for a short period of time and then not accessed again for an extended period of time. This may essentially deceive the LFU counter.

Thus, embodiments described herein learns the ideal cache policy and the behavior over time to avoid such situations, which may be very dependent on the particular input graph. As such, some embodiments may alternate between the LFU and LRU scheme and provide flexible cache policies. Thus, cache policies herein take advantage of the notion that each node has some locality with respect to its neighbors and all graph datasets follow the power-law, with most of the nodes having few edges and a small fraction of nodes featuring many edges.

FIG. 2 shows a method 300 of generating a cache policy for GNN processing according to embodiments herein. The method 300 may generally be implemented with the embodiments described herein, for example, the GNN training process 100 (FIG. 1), already discussed. More particularly, the method 300 may be implemented in one or more modules as a set of logic instructions stored in a machine- or computer-readable storage medium such as random access memory (RAM), read only memory (ROM), programmable ROM (PROM), firmware, flash memory, etc., in hardware, or any combination thereof. For example, hardware implementations may include configurable logic, fixed-functionality logic, or any combination thereof. Examples of configurable logic include suitably configured programmable logic arrays (PLAs), field programmable gate arrays (FPGAs), complex programmable logic devices (CPLDs), and general purpose microprocessors. Examples of fixed-functionality logic include suitably configured application specific integrated circuits (ASICs), combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

For example, computer program code to carry out operations shown in the method 300 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 302 determines, with a neural network, that a first eviction node stored in a cache will be evicted from the cache based on a cache policy, where the first eviction node is part of a plurality of nodes associated with a graph, further where a subset of nodes of the plurality of nodes remain in the cache after the eviction of the first eviction node from the cache. Illustrated processing block 304 tracks a number of cache hits on the cache during an aggregation operation associated with a hardware accelerator, where the aggregation operation is executed on the subset of nodes that remain in the cache after the eviction of the eviction node from the cache. Illustrated processing block 306 executes a training process on the neural network to adjust the cache policy based on the number of the cache hits. The training process is a reinforcement learning process that includes generating a reward based on the number of cache hits and adjusting the cache policy based on the reward. The training process includes an update to weights of the neural network based on the cache hits. Each of the cache hits is an identification that aggregation data requested by a data request associated with the aggregation operation is stored in the cache to bypass retrieval of the aggregation data from a data storage (e.g., a hard-disk or other storage).

In some embodiments, the method 300 further includes identifying a state of cache lines of a set of the cache, where the state identifies for each respective cache line of the cache lines, a first number of accesses to the respective cache line, and a second number of accesses that were issued to the set after the respective cache line was last accessed, and identifying a second eviction node stored in a first cache line from the cache lines to evict based on the state. In some embodiments, the method 300 further includes identifying a cache miss (e.g., aggregation data for a data request associated with the aggregation operation is not stored in the cache so that data has to be retrieved from a data storage and moved into the cache to execute the aggregation operation) during the aggregation operation, generating a reward based on the cache hits and in response to the cache miss, and executing the training process in response to the cache miss, where the training process is a reinforcement learning process.

In some embodiments, the method 300 further includes retrieving, with a host processor, the subset of nodes. In such embodiments, the method 300 further includes compressing, with the host processor, the subset of nodes to generate compressed nodes. In such embodiments, the method 300 includes receiving, with the hardware accelerator, the compressed nodes. In such embodiments, the method 300 includes decompressing, with the hardware accelerator, the compressed nodes to obtain the subset of nodes.

Thus, the method 300 may result in enhanced cache policies that reduces the frequency of cache misses and increases the frequency of cache hits. Moreover, the method 300 may reduce training time for GNNs due to the reduced latency for cache accesses. Additionally, communication latency, power and overhead may be reduced by the compression described above.

Figures 3, 4A:
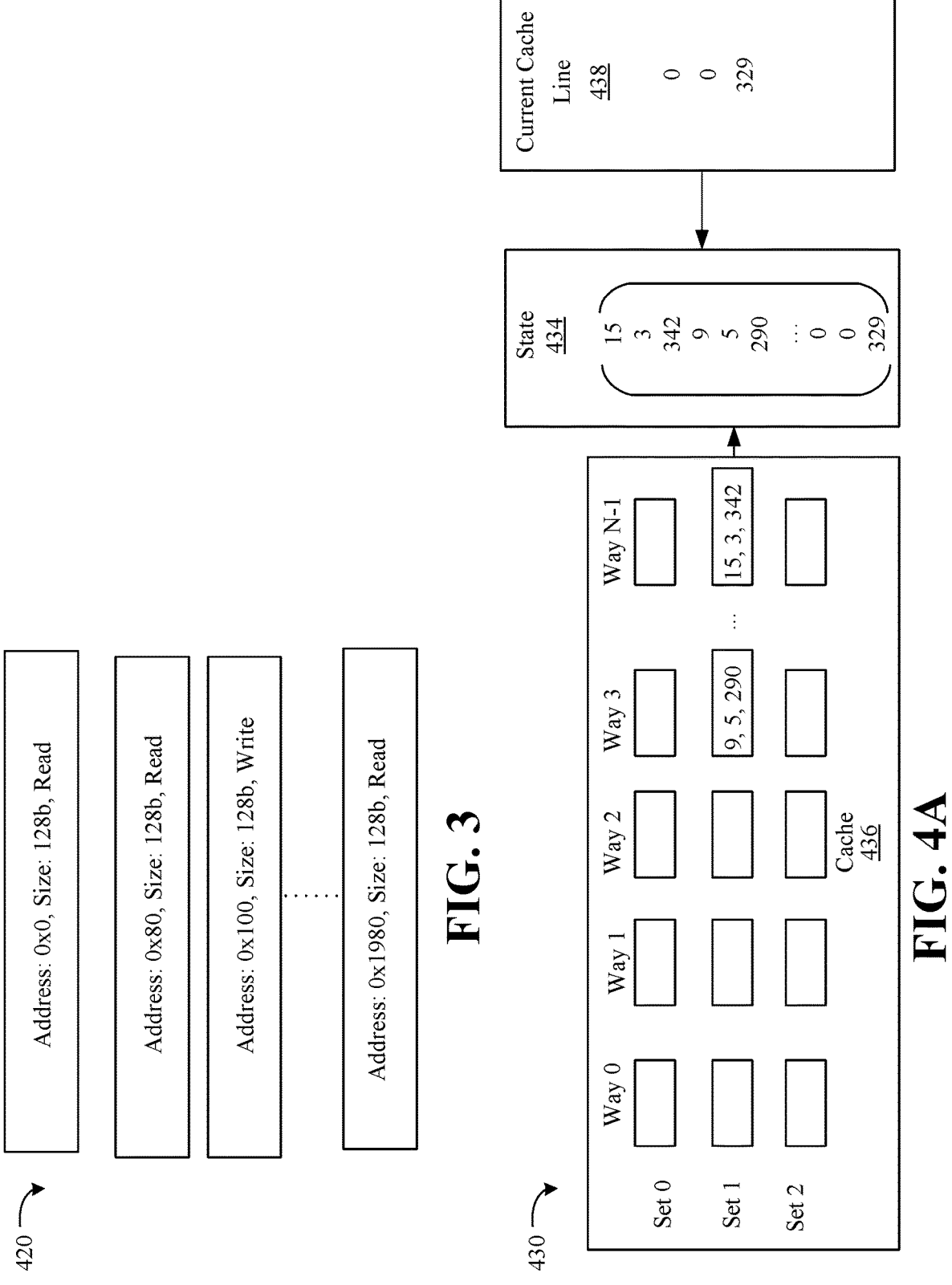
FIG. 3 is an illustration of examples of series of accesses that are fed to a cache according to an embodiment.
FIGS. 4A and 4B are illustrations of examples of a state generation and action generation process according to an embodiment.

FIG. 3 illustrates a series of accesses 420 that may be fed to a cache. The accesses may operate with any of the embodiments described herein such as GNN training process 100 (FIG. 1) and/or method 300 (FIG. 2). The accesses may originate with an environment, such as environment 106 (FIG. 1), and be fed to a cache, which may correspond to cache 102 (FIG. 1). For example, a cache may be accessed with the accesses until a cache miss occurs, at which time the state and environment may be output to an agent for reinforcement learning training.

Figure 4B:
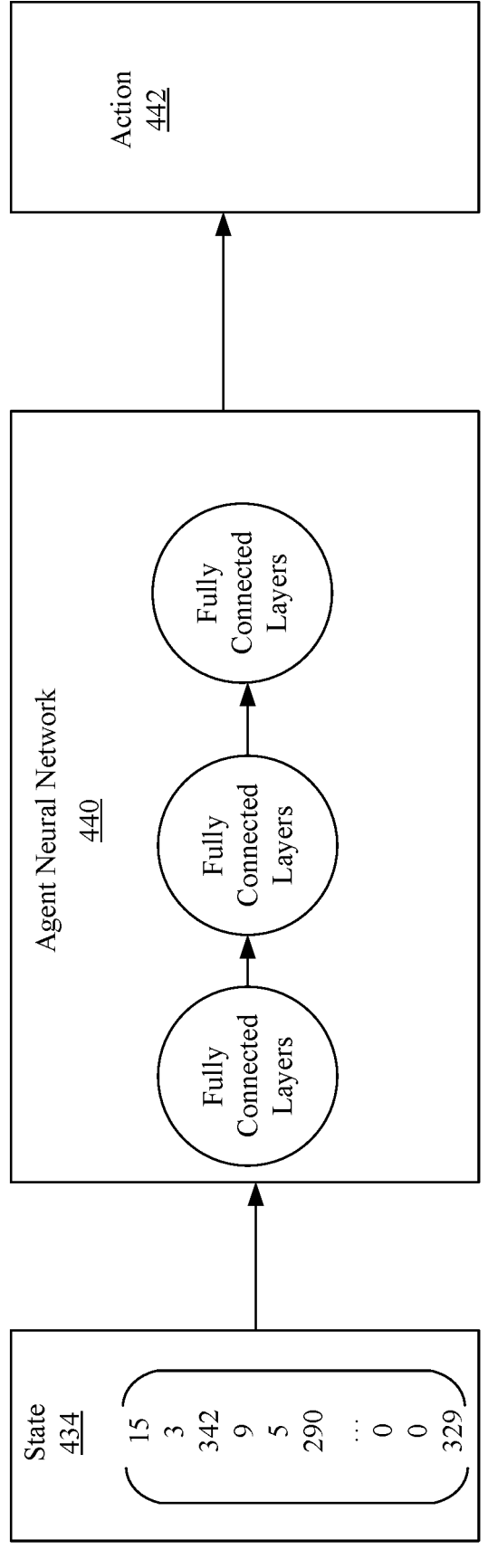

FIGS. 4A-4B illustrates a state generation and action generation process 430 to feed a cache 436 accesses until an eviction occurs in any set. The state generation and action generation process 430 may generally be implemented with the embodiments described herein, for example, the GNN training process 100 (FIG. 1) and/or method 300 (FIG. 2), already discussed. As illustrated, the cache 436 includes a series of three sets 0, 1, 2 and several ways 0 to N−1. In this example, state 434 shows information related to each of the ways 0 to N−1 and sets 0, 1, 2. For example, the first three elements (15, 3, 342) of the state 434 correspond to way N−1 of set 1. The next three elements (9, 5, 290) correspond to way 3 of set 1. The state 434 may be updated during an aggregation process. The information related to each of the ways 0 to N−1 and sets 0, 1, 2 may include any of the state related information described herein. In this example, the information of each respective element of the ways 0 to N−1 and sets 0, 1, 2 includes a number of accesses to the respective element, a number of access since the respective element was last accessed, and number of edges of a node stored in the respective element. The elements of FIG. 4A may correspond to an environment, such as environment 106 (FIG. 1).

A current cache line 438 is added to the state 434. The current cache line 438 is a new node that will be stored in the cache 436 and will be added to the cache 436. In order to do so, a cache eviction must occur since the current cache line 438 is not currently stored in the cache 436. The current cache line 438 is added to the state 434.

Turning now to FIG. 4B, the state 434 is then provided to an agent neural network 440. The agent neural network 440 may be part of agent 108 (FIG. 1), and specifically the NN 138 (FIG. 1). The agent neural network 440 includes fully connected layers. The agent neural network 440 may generate an action 442 based on the state 434. The action 442 may be an eviction from the cache 436, and specifically which element of way 0 to N−1 and set 0, 1 2 to evict (e.g., element at set 1 and way N−1). The above state generation and action generation process 430 may then repeat identifying cache hits and misses during an aggregation process, updating the state 434 and selecting new evictions.

Figure 5:
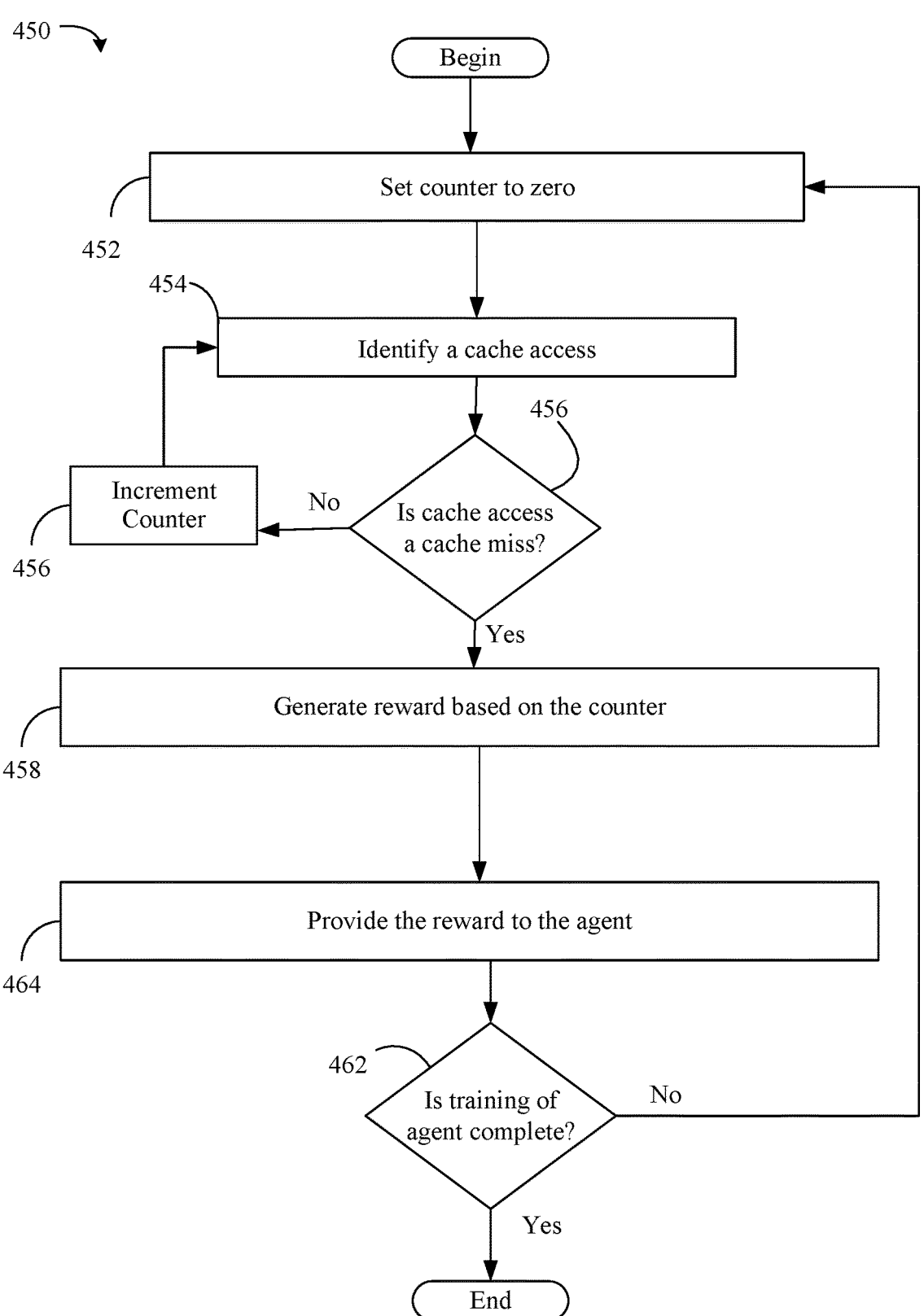
FIG. 5 is a flowchart of an example of a method of generating a reward to train a neural network agent according to an embodiment.

FIG. 5 shows a method 450 of generating a reward to train a neural network agent such as agent 108 (FIG. 1) and agent neural network 440 (FIG. 4B). The method 450 may generally be implemented with other embodiments described herein, for example, the environment 106 (FIG. 1), the method 300 (FIG. 2) and/or state generation and action generation process 430 (FIG. 4) already discussed. The method 450 may be implemented in one or more modules as a set of logic instructions stored in a machine- or computer-readable storage medium such as RAM, ROM, PROM, firmware, flash memory, etc., in hardware, or any combination thereof. For example, hardware implementations may include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

Illustrated processing block 452 sets a counter to zero. The counter will track a number of cache hits. Illustrated processing block 454 identifies a cache access. Illustrated processing block 456 determines if the cache access is a cache miss. If not, illustrated processing block 460 increments the counter. Otherwise, illustrated processing block 458 generates a reward based on the counter in response to the cache miss occurring. Illustrated processing block 464 provides the reward to an agent. Illustrated processing block 462 determines if the training of the agent is complete. If so, the method 450 ends.

Otherwise, processing block 452 sets the counter to zero effectively restarting the count of the cache hits. Thus, the method 450 may track cache hits between evictions. That is, the counter is reset to zero in response to a cache miss occurring in processing block 456. The method 450 then repeats, and the counter tracks cache hits until a cache miss is detected in processing block 456 again, which results in a reward being generated and provided to the agent by processing block 458.

Figure 6:
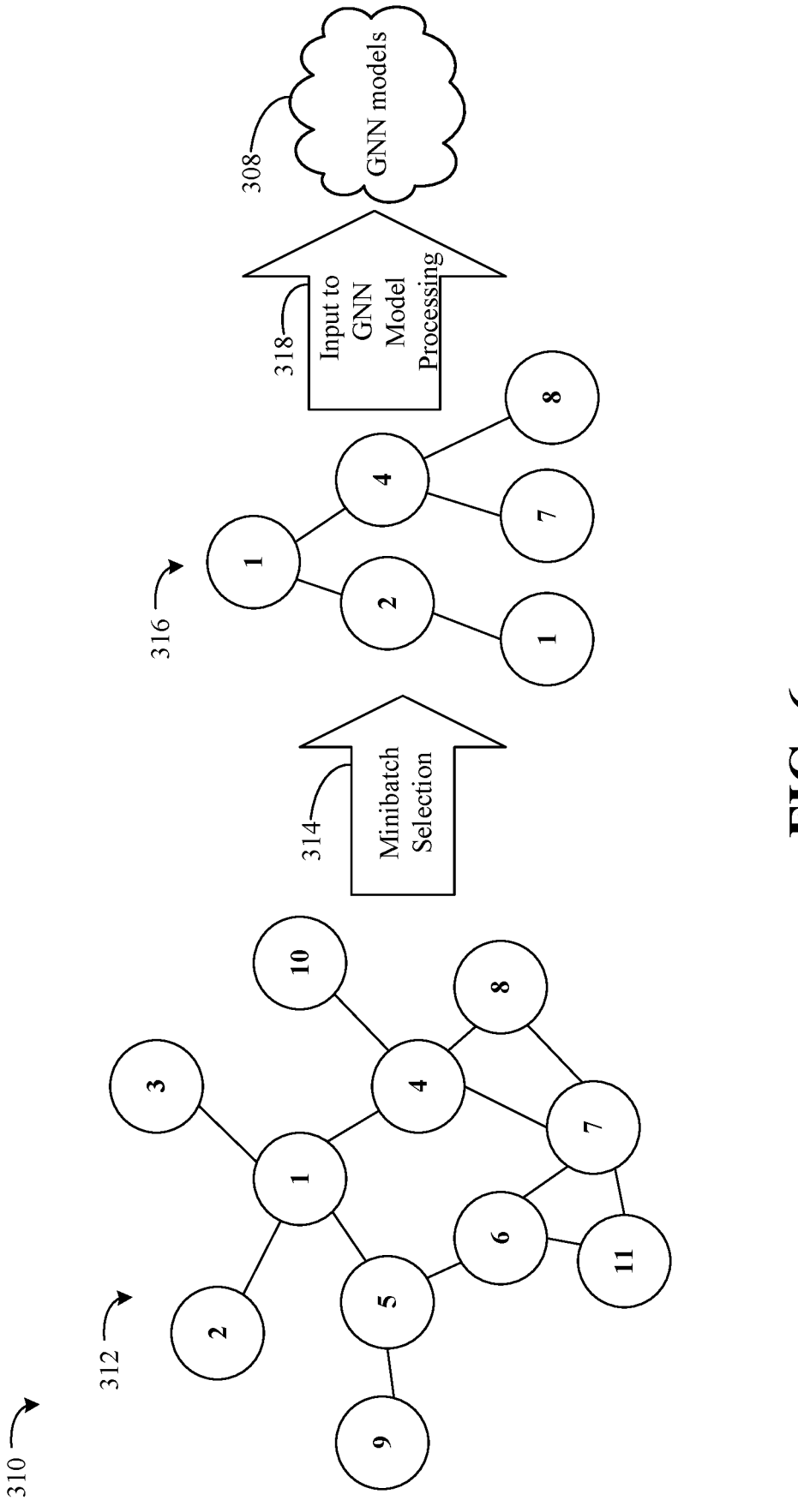
FIG. 6 is an illustration of an example of a minibatch selection process according to an embodiment.

FIG. 6 illustrates a minibatch selection process 310 based on a random walk approach. The minibatch selection process 310 may generally be implemented with the embodiments described herein, for example, the GNN training process 100 (FIG. 1), method 300 (FIG. 2), state generation and action generation process 430 (FIG. 4) and/or method 450 (FIG. 5), already discussed. A full graph 312 is illustrated. In order to process the full graph 312, the full graph 312 is portioned into subgraphs. In this example, the minibatch selection 314 selects the subgraph 316. The subgraph 316 includes nodes 1, 2, 4, 7 and 8. These nodes 1, 2, 4, 7 and 8 are interconnected. For example, in the graph 312, node 1 is connected to nodes 2 and 4, node 2 is connected to 1, and node 4 is connected to nodes 7 and 8. Thus, these interconnections are illustrated in the subgraph 316. Notably, the subgraph 316 may include node 1 twice since it is connected to 2 (connected nodes are randomly sampled). The minibatch selection process 310 then provides the input to the GNN model 308 processing 318 on the subgraph 316 based on the subgraph 316.

For example, once the subgraph 316 is sampled, the mini batch of sampled nodes 1, 2, 4, 7 and 8 of the subgraph 316 may be fed to the GNN models 308 for aggregation. Aggregation may be similar to a convolution on image pixels. Instead of convolving neighboring pixels, aggregation convolves neighboring node samples, and as such, creates an embedding for a node in focus.

Figure 7:
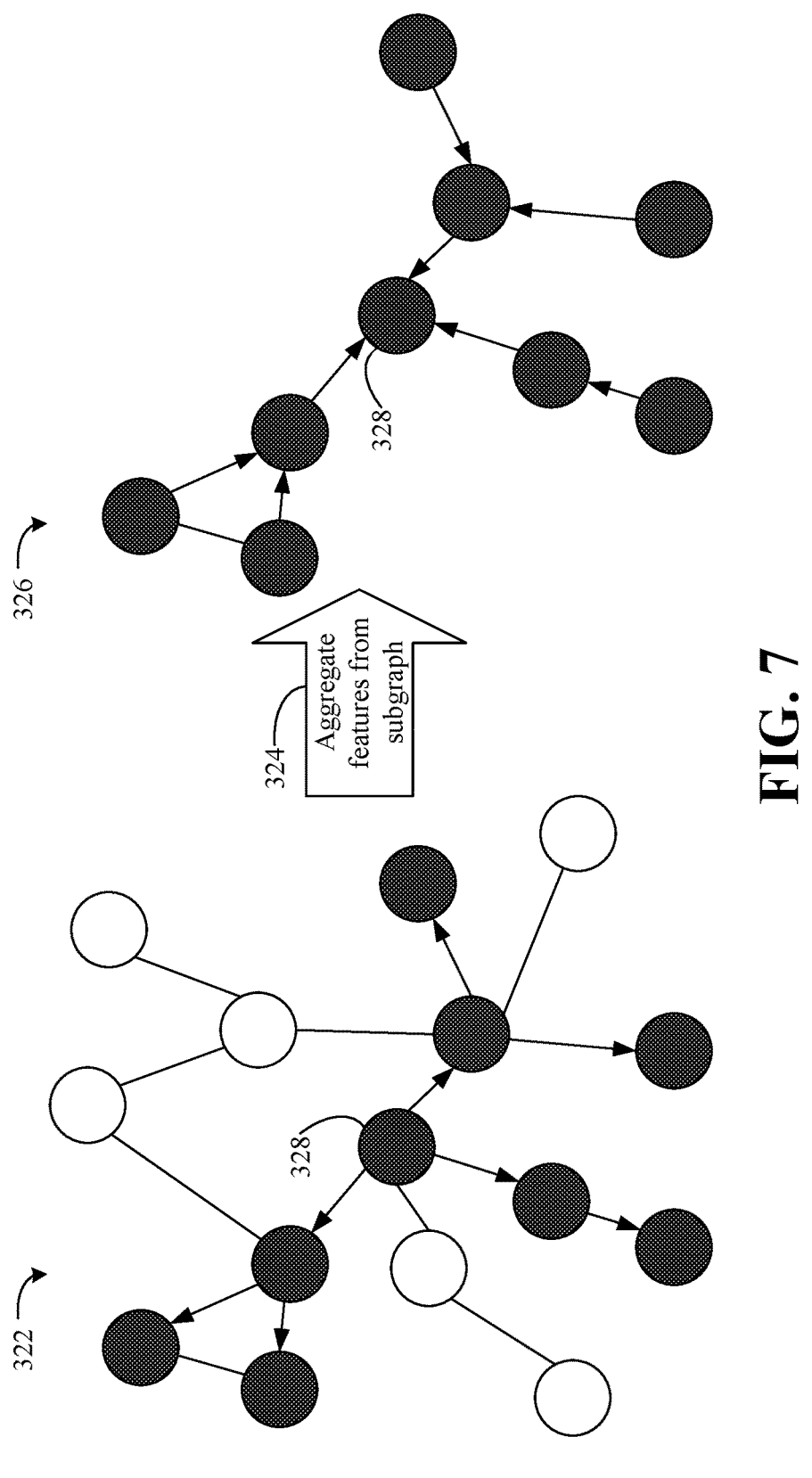
FIG. 7 is an illustration of example of an aggregation process according to an embodiment.

FIG. 7 illustrates an aggregation process 320. The aggregation process 320 may generally be implemented with the embodiments described herein, for example, the GNN training process 100 (FIG. 1), method 300 (FIG. 2), state generation and action generation process 430 (FIG. 4), method 450 (FIG. 5) and/or minibatch selection process (310) (FIG. 6), already discussed. The aggregation process 320 includes selecting a subgraph 326 of nodes, shown in black, from a graph 322. The aggregation process 320 then aggregates features from the subgraph, 326 324. That is, features from nodes of the subgraph 326 are aggregated to a central node 328 as described herein to generate an embedding for the central node 328 based on features of neighbor nodes from the subgraph 326.

Figure 8:
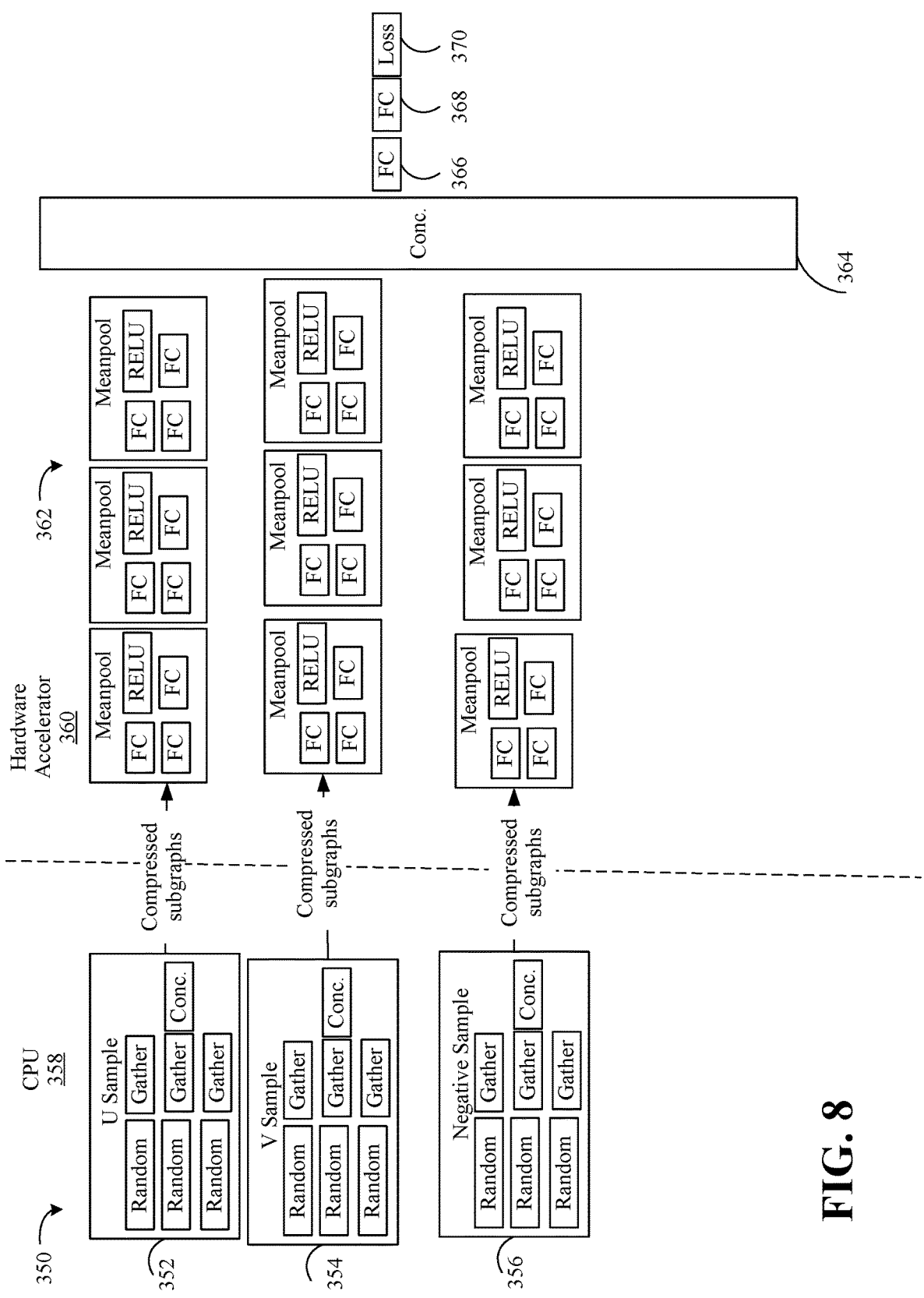
FIG. 8 is a block diagram of an example of a computing architecture for cache management and aggregation operations according to an embodiment.

FIG. 8 illustrates a computing architecture 350 to implement aspects of the embodiments described herein. The computing architecture 350 may generally be implemented with the embodiments described herein, for example, the GNN training process 100 (FIG. 1), method 300 (FIG. 2), state generation and action generation process 430 (FIG. 4), method 450 (FIG. 5), minibatch selection process (310) (FIG. 6) and/or aggregation process 320 (FIG. 7) already discussed.

Compute for GNNs may be balanced across the CPU 358 and hardware accelerator 360 (e.g., graphics processing unit (GPU), XPUs that may include CPUs, GPUs, Field Programmable Gate Arrays (FPGAs) and other types of accelerators). The CPU 358 may be connected to the hardware accelerator 360 via a Peripheral Component Interconnect Express (PCIe) architecture. The sampling component to select subgraphs may be deployed on the CPU 358. That is, the CPU 358 may execute graph traversal, random reads, etc. to retrieve subgraphs. The aggregation operations are deployed on the hardware accelerator 360 (e.g., a GPU that includes common deep learning layers) based on the subgraphs. Thus, the CPU 358 may implement aspects of the agent and an environment to select subgraphs (e.g., decide whether to evict nodes or add nodes to a cache), compress the subgraphs and feed the compressed subgraphs to the hardware accelerator 360 which executes aggregation operations.

Notably, the CPU 358 compresses the subgraphs prior to communication to the hardware accelerator 360. For example, U sample, V sample and negative sample 352, 354, 356 provide compressed subgraphs to the hardware accelerator 360. The hardware accelerator 360 then decompresses the subgraphs and executes operations on the subgraphs with the Meanpools 362. The concatenator 364 may then concatenate an output of the operations. The concatenated output is then processed by fully connected layers 366, 368, and generates a loss 370.

Thus, some embodiments address communicational bottlenecks by compressing the subgraphs on the CPU 358 side prior to communicating to the hardware accelerator 360, and as a result, reduces the minibatch footprint (e.g., up to 50%). Certain graphs (e.g., social network graphs) exhibit high homophily coefficient (e.g., a probability that two nearby nodes have similar features). To this end, some embodiments employ graph compression techniques such as Graph Diffusion Convolution (GDC). GDC is a message passing technique with GNNs but may also be applied as an efficient compression operator. Thus, some embodiments employ GDC to remove redundant features and edges from each sub-graph by diffusing the nodes and edges. The intuition is similar to applying a Gaussian filter on images. Embodiments may be easily integrated into any GNN architecture as the compression may be inserted as a compression engine inserted within the GNN flow.

FIG. 9 shows a method 400 of compressing a subgraph. The method 400 may generally be implemented with the embodiments described herein, for example, the GNN training process 100 (FIG. 1), method 300 (FIG. 2), state generation and action generation process 430 (FIG. 4), method 450 (FIG. 5), minibatch selection process (310) (FIG. 6), aggregation process 320 (FIG. 7) and/or computing architecture 350 (FIG. 8) already discussed. The method 400 may be implemented in one or more modules as a set of logic instructions stored in a machine- or computer-readable storage medium such as RAM, ROM, PROM, firmware, flash memory, etc., in hardware, or any combination thereof. For example, hardware implementations may include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

Illustrated processing block 402 determines that a subgraph of a graph is to be communicated from a CPU (or host processor) to a hardware accelerator (e.g., GPU, XPU, FPGA, etc.). Illustrated processing block 404 compresses the subgraph prior to transmission of the subgraph from the CPU to the hardware accelerator. Illustrated processing block 406 receives the compressed subgraph on the hardware accelerator. For example, some embodiments may execute graph diffusion, then generate density defined edges, sparsify the edges and then generate a new graph. Illustrated processing block 408 decompresses the compressed subgraph on the hardware accelerator. Illustrated processing block 410 executes operations on the decompressed subgraphs.

Figure 10:
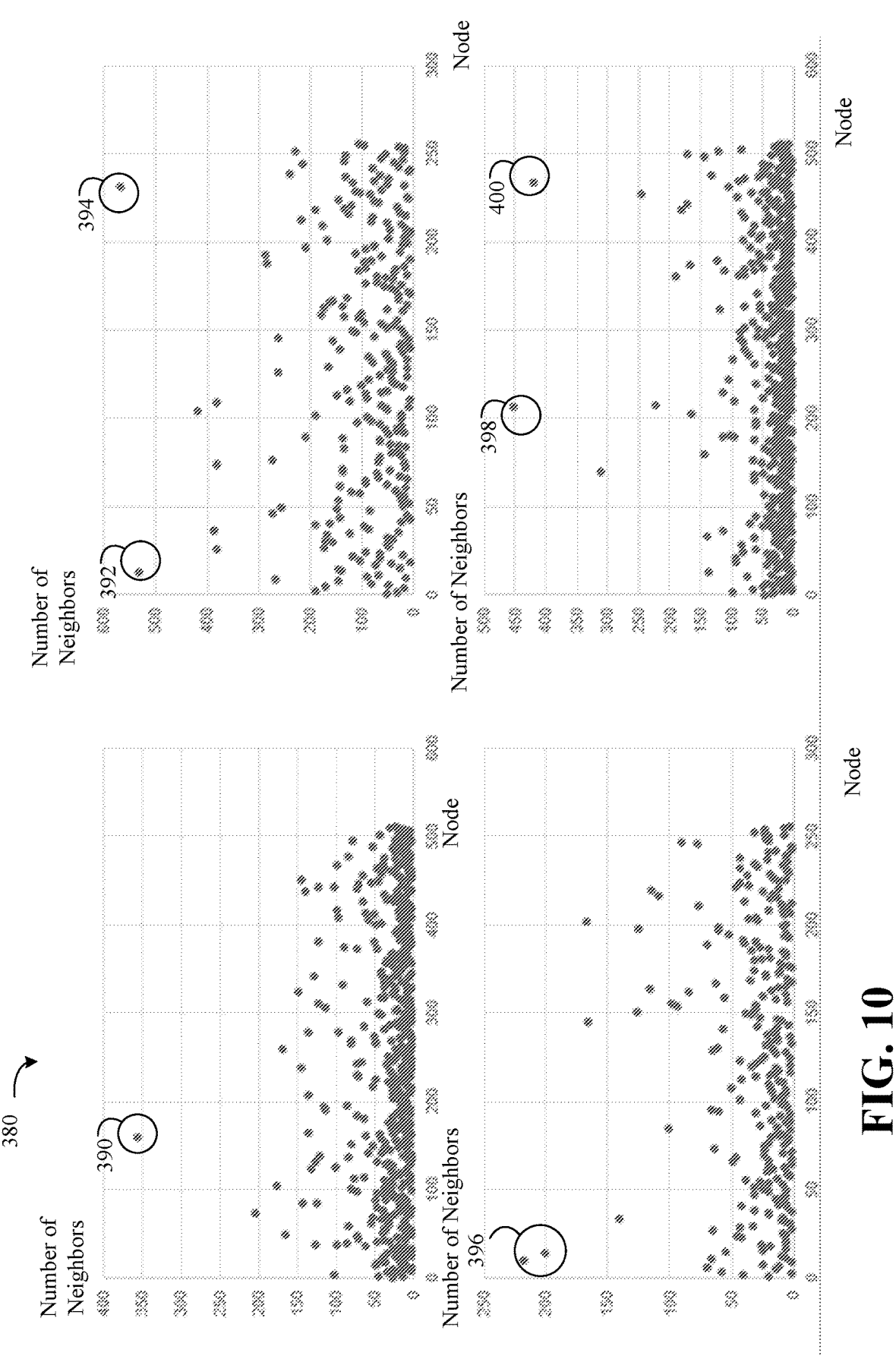
FIG. 10 is an example of graphs showing a number of neighbors per node in time according to an embodiment.

FIG. 10 illustrates different graphs 382 that map the number of neighbors per node (y-axis) in per node number (x-axis), as each node enters the aggregation operation. The data exhibits significant fluctuation, where the vast majority of nodes have a small number of neighbors. For example, in graphs 380, only nodes illustrated in circles 390, 392, 394, 396, 398 are highly connected. If an improper cache eviction scheme is selected, significant thrashing may occur since nodes may be frequently removed. That is, this results in thrashing in the cache as many nodes will be removed from the cache given the nodes will not recur throughout the batch. As such, embodiments adjust the cache policy based on the graph and reinforcement learning.

Figure 11:
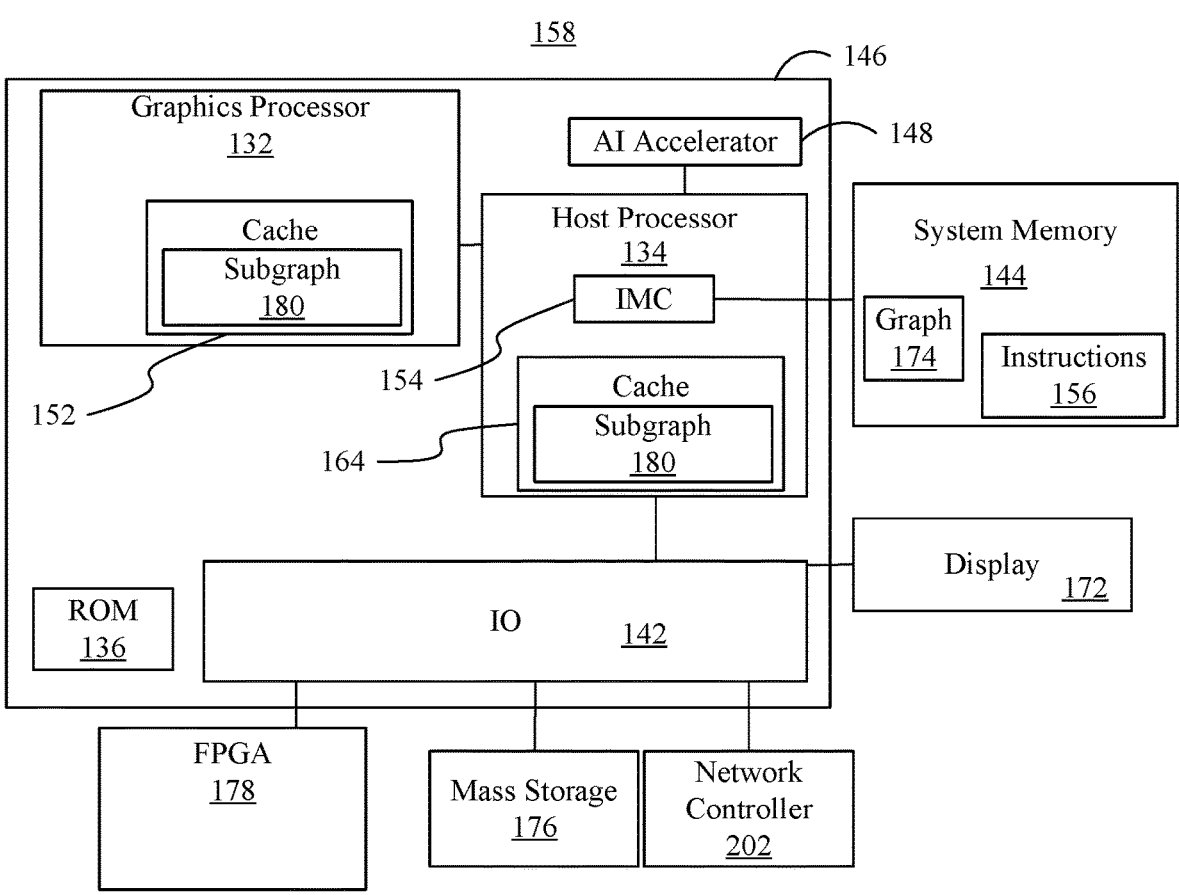
FIG. 11 is a block diagram of an example of low-latency training and low-communication overhead computing system according to an embodiment.

Turning now to FIG. 11, a low-latency training and low-communication overhead computing system 158 is shown. The computing system 158 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the computing system 158 includes a host processor 134 (e.g., CPU) having an integrated memory controller (IMC) 154 that is coupled to a system memory 144. The host processor 134 includes a cache 164 that stores a subgraph 180. For example, the host processor 134 may access a system memory 144 to retrieve nodes of the graph 174. The nodes may be stored as the subgraph 180. The host processor 134 may compress the subgraph 180 and provide the compressed subgraph to a graphics processor 132. The graphics processor 132 may then decompress the subgraph 180 and store the subgraph 180 in cache 152.

The illustrated computing system 158 also includes an input output (IO) module 142 implemented together with the host processor 134, the graphics processor 132 (e.g., GPU), ROM 136, and AI accelerator 148 on a semiconductor die 146 as a system on chip (SoC). The illustrated IO module 142 communicates with, for example, a display 172 (e.g., touch screen, liquid crystal display/LCD, light emitting diode/LED display), a network controller 202 (e.g., wired and/or wireless), FPGA 178 and mass storage 176 (e.g., hard disk drive/HDD, optical disk, solid state drive/SSD, flash memory). Furthermore, the SoC 146 may further include processors (not shown) and/or the AI accelerator 148 dedicated to artificial intelligence (AI) and/or neural network (NN) processing. For example, the system SoC 146 may include vision processing units (VPUs,) and/or other AI/NN-specific processors such as AI accelerator 148, etc. In some embodiments, any aspect of the embodiments described herein may be implemented in the processors such as host processor 134 and graphics processor 132 and/or accelerators dedicated to AI and/or NN processing such as AI accelerator 148.

The graphics processor 132 and/or the host processor 134 may execute instructions 156 retrieved from the system memory 144 (e.g., a dynamic random-access memory) and/or the mass storage 176 to implement aspects as described herein. For example, the host processor 134 may retrieve and store the subgraph 180. The AI accelerator 148 and/or graphics processor 132 may execute aggregation operations on the subgraph 180 and track cache hits and misses. Each of the cache hits is associated with an identification that aggregation data requested by a data request associated with the aggregation operation(s) is stored in the cache 152 to bypass retrieval of the aggregation data from a data storage such as system memory 144 or mass storage 176. That is, the cache hit is a state in which the aggregation data is found in the cache 152. A cache miss includes the aggregation data not being stored in the cache 152 such that retrieval of the aggregation data from the data storage is executed, and the aggregation data is then moved into the cache 152 to execute the aggregation operation. A cache policy for evictions may be updated based on the cache hits to reduce the number of cache misses during the aggregation operations.

When the instructions 156 are executed, the computing system 158 may implement one or more aspects of the embodiments described herein. For example, the computing system 158 may implement one or more aspects of the GNN training process 100 (FIG. 1), method 300 (FIG. 2), state generation and action generation process 430 (FIG. 4), method 450 (FIG. 5), minibatch selection process (310) (FIG. 6), aggregation process 320 (FIG. 7), computing architecture 350 (FIG. 8) and/or method 400 (FIG. 9) already discussed. The illustrated computing system 158 is therefore considered to be performance-enhanced at least to the extent that it enables the computing system 158 to reduce latency during training, cache overhead and communicational overhead.

Figure 12:
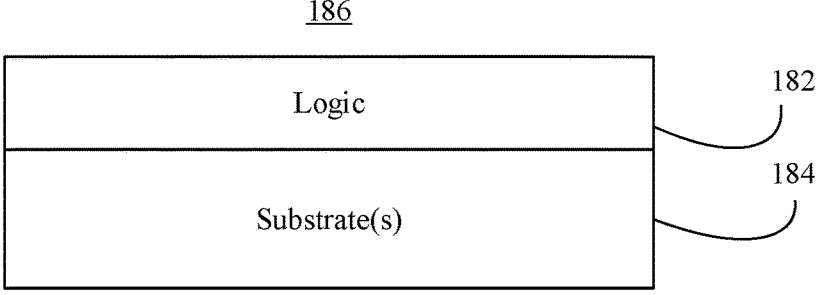
FIG. 12 is an illustration of an example of a semiconductor apparatus according to an embodiment.

FIG. 12 shows a semiconductor apparatus 186 (e.g., chip, die, package). The illustrated apparatus 186 includes one or more substrates 184 (e.g., silicon, sapphire, gallium arsenide) and logic 182 (e.g., transistor array and other integrated circuit/IC components) coupled to the substrate(s) 184. In an embodiment, the apparatus 186 is operated in an application development stage and the logic 182 performs one or more aspects of the embodiments described herein, for example, The apparatus 186 may generally implement the embodiments described herein, for example, the GNN training process 100 (FIG. 1), method 300 (FIG. 2), state generation and action generation process 430 (FIG. 4), method 450 (FIG. 5), minibatch selection process (310) (FIG. 6), aggregation process 320 (FIG. 7), computing architecture 350 (FIG. 8) and/or method 400 (FIG. 9) already discussed. The logic 182 may be implemented at least partly in configurable logic or fixed-functionality hardware logic. In one example, the logic 182 includes transistor channel regions that are positioned (e.g., embedded) within the substrate(s) 184. Thus, the interface between the logic 182 and the substrate(s) 184 may not be an abrupt junction. The logic 182 may also be considered to include an epitaxial layer that is grown on an initial wafer of the substrate(s) 184.

Figure 13:
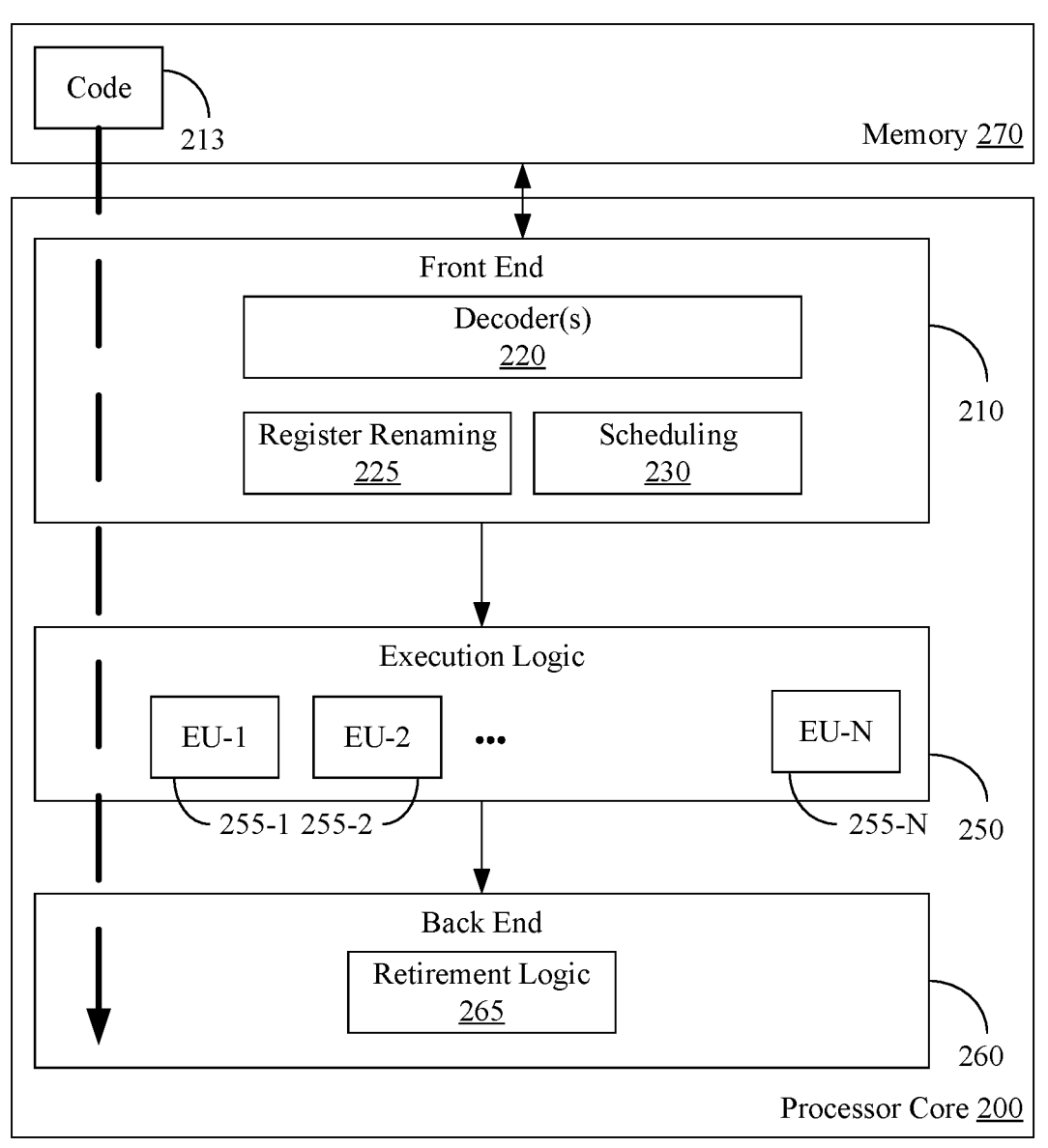
FIG. 13 is a block diagram of an example of a processor according to an embodiment.

FIG. 13 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 13, a processing element may alternatively include more than one of the processor core 200 illustrated in FIG. 13. The processor core 200 may be a single-threaded core or, for at least one embodiment, the processor core 200 may be multithreaded in that it may include more than one hardware thread context (or "logical processor") per core.

FIG. 13 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the embodiments such as, for example, the GNN training process 100 (FIG. 1), method 300 (FIG. 2), state generation and action generation process 430 (FIG. 4), method 450 (FIG. 5), minibatch selection process (310) (FIG. 6), aggregation process 320 (FIG. 7), computing architecture 350 (FIG. 8) and/or method 400 (FIG. 9) already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include several execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back-end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 13, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 14:
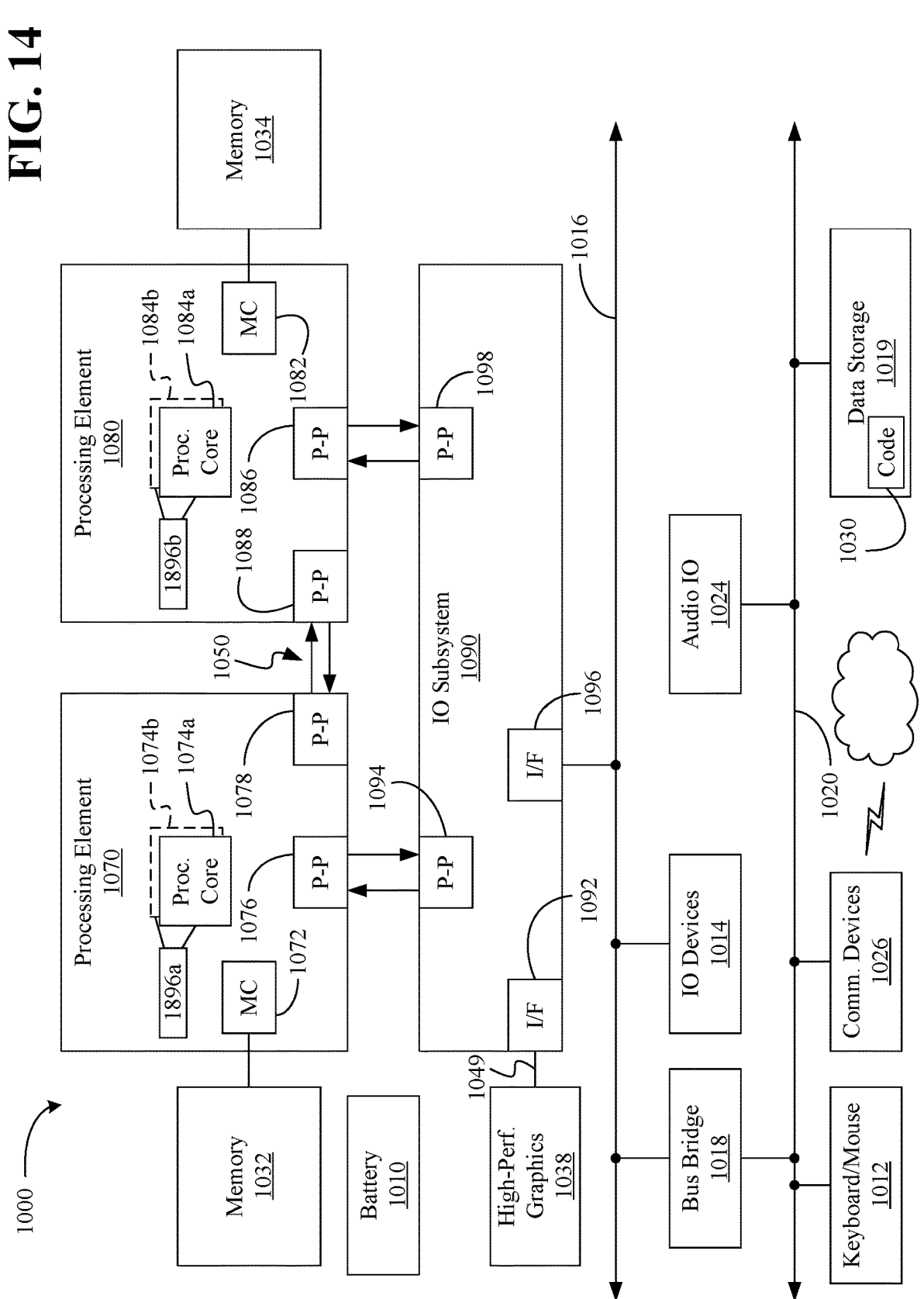
FIG. 14 is a block diagram of an example of a multiprocessor based computing system according to an embodiment.

Referring now to FIG. 14, shown is a block diagram of a computing system 1000 embodiment in accordance with an embodiment. Shown in FIG. 14 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood any or all the interconnects illustrated in FIG. 14 may be implemented as a multi-drop bus rather than point-to-point interconnect.

As shown in FIG. 14, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner like that discussed above in connection with FIG. 13.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 14, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 14, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments is not so limited.

As shown in FIG. 14, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the one or more aspects of such as, for example, the GNN training process 100 (FIG. 1), method 300 (FIG. 2), state generation and action generation process 430 (FIG. 4), method 450 (FIG. 5), minibatch selection process (310) (FIG. 6), aggregation process 320 (FIG. 7), computing architecture 350 (FIG. 8) and/or method 400 (FIG. 9) already discussed. Further, an audio I/O 1024 may be coupled to second bus 1020 and a battery 1010 may supply power to the computing system 1000.

Note that other embodiments are contemplated. For example, instead of the point-to-point architecture of FIG. 14, a system may implement a multi-drop bus or another such communication topology. Also, the elements of FIG. 14 may alternatively be partitioned using more or fewer integrated chips than shown in FIG. 14.

Additional Notes and Examples:

Example 1 includes a computing system comprising a host processor, a hardware accelerator coupled to the host processor, and a memory coupled to the hardware accelerator, the memory including a set of executable program instructions, which when executed by one or more of the host processor or the hardware accelerator, cause the computing system to determine, with a neural network, that a first eviction node stored in a cache is to be evicted from the cache based on a cache policy, wherein the first eviction node is part of a plurality of nodes associated with a graph, wherein a subset of nodes of the plurality of nodes remain in the cache after the eviction of the first eviction node from the cache, track a number of cache hits on the cache during an aggregation operation associated with the hardware accelerator, and wherein the aggregation operation is executed on the subset of nodes that remain in the cache after the eviction of the first eviction node from the cache, and execute a training process on the neural network to adjust the cache policy based on the number of the cache hits.

Example 2 includes the computing system of example 1, wherein the training process is to be a reinforcement learning process that includes a generation of a reward based on the number of cache hits, and an adjustment of the cache policy based on the reward.

Example 3 includes the computing system of any one of examples 1 and 2, wherein the executable program instructions, when executed, cause the computing system to identify a state of cache lines of a set of the cache, wherein the state is to identify for each respective cache line of the cache lines, a first number of accesses to the respective cache line, and a second number of accesses that were issued to the set after the respective cache line was last accessed, and identify a second eviction node stored in a first cache line from the cache lines to evict based on the state.

Example 4 includes the computing system of example 1, wherein the executable program instructions, when executed, cause the computing system to identify a cache miss during the aggregation operation, generate a reward based on the cache hits and in response to the cache miss, and execute the training process in response to the cache miss, wherein the training process is a reinforcement learning process, wherein the training process is to include an update to weights of the neural network based on the cache hits.

Example 5 includes the computing system of any one of examples 1 to 4, wherein each of the cache hits is associated with an identification that aggregation data requested by a data request associated with the aggregation operation is stored in the cache to bypass retrieval of the aggregation data from a data storage.

Example 6 includes the computing system of any one of examples 1 to 5, wherein the executable program instructions, when executed, cause the computing system to retrieve, with the host processor, the subset of nodes, compress, with the host processor, the subset of nodes to generate compressed nodes, receive, with the hardware accelerator, the compressed nodes, and decompress, with the hardware accelerator, the compressed nodes to obtain the subset of nodes.

Example 7 includes a semiconductor apparatus comprising one or more substrates, and logic coupled to the one or more substrates, wherein the logic is implemented in one or more of configurable logic or fixed-functionality logic hardware, the logic coupled to the one or more substrates to determine, with a neural network, that a first eviction node stored in a cache is to be evicted from the cache based on a cache policy, wherein the first eviction node is part of a plurality of nodes associated with a graph, wherein a subset of nodes of the plurality of nodes remain in the cache after the eviction of the first eviction node from the cache, track a number of cache hits on the cache during an aggregation operation associated with a hardware accelerator, and wherein the aggregation operation is executed on the subset of nodes that remain in the cache after the eviction of the first eviction node from the cache, and execute a training process on the neural network to adjust the cache policy based on the number of the cache hits.

Example 8 includes the apparatus of example 7, wherein the training process is to be a reinforcement learning process that includes a generation of a reward based on the number of cache hits, and an adjustment of the cache policy based on the reward.

Example 9 includes the apparatus of any one of examples 7 to 8, the logic coupled to the one or more substrates is to identify a state of cache lines of a set of the cache, wherein the state is to identify for each respective cache line of the cache lines, a first number of accesses to the respective cache line, and a second number of accesses that were issued to the set after the respective cache line was last accessed, and identify a second eviction 5 node stored in a first cache line from the cache lines to evict based on the state.

Example 10 includes the apparatus of example 7, wherein the logic coupled to the one or more substrates is to identify a cache miss during the aggregation operation, generate a reward based on the cache hits and in response to the cache miss, and execute the training process in response to the cache miss, wherein the training process is a reinforcement learning process, wherein the training process is to include an update to weights of the neural network based on the cache hits.

Example 11 includes the apparatus of any one of examples 7 to 10, wherein each of the cache hits is associated with an identification that aggregation data requested by a data request associated with the aggregation operation is stored in the cache to bypass retrieval of the aggregation data from a data storage.

Example 12 includes the apparatus of any one of examples 7 to 11, wherein the logic coupled to the one or more substrates is to retrieve, with a host processor, the subset of nodes, compress, with the host processor, the subset of nodes to generate compressed nodes, receive, with the hardware accelerator, the compressed nodes, and decompress, with the hardware accelerator, the compressed nodes to obtain the subset of nodes.

Example 13 includes the apparatus of any one of examples 7 to 12, wherein the logic coupled to the one or more substrates includes transistor channel regions that are positioned within the one or more substrates.

Example 14 includes at least one computer readable storage medium comprising a set of executable program instructions, which when executed by a computing system, cause the computing system to determine, with a neural network, that a first eviction node stored in a cache is to be evicted from the cache based on a cache policy, wherein the first eviction node is part of a plurality of nodes associated with a graph, wherein a subset of nodes of the plurality of nodes remain in the cache after the eviction of the first eviction node from the cache, track a number of cache hits on the cache during an aggregation operation associated with a hardware accelerator, and wherein the aggregation operation is executed on the subset of nodes that remain in the cache after the eviction of the first eviction node from the cache, and execute a training process on the neural network to adjust the cache policy based on the number of the cache hits.

Example 15 includes the at least one computer readable storage medium of example 14, wherein the training process is to be a reinforcement learning process that includes a generation of a reward based on the number of cache hits, and an adjustment of the cache policy based on the reward.

Example 16 includes the at least one computer readable storage medium of any one of examples 14 and 15, wherein the instructions, when executed, further cause the computing system to identify a state of cache lines of a set of the cache, wherein the state is to identify for each respective cache line of the cache lines, a first number of accesses to the respective cache line, and a second number of accesses that were issued to the set after the respective cache line was last accessed, and identify a second eviction node stored in a first cache line from the cache lines to evict based on the state.

Example 17 includes the at least one computer readable storage medium of claim 14, wherein the instructions, when executed, further cause the computing system to identify a cache miss during the aggregation operation, generate a reward based on the cache hits and in response to the cache miss, and execute the training process in response to the cache miss, wherein the training process is a reinforcement learning process, wherein the training process is to include an update to weights of the neural network based on the cache hits.

Example 18 includes the at least one computer readable storage medium of any one of examples 14 to 17, wherein each of the cache hits is associated with an identification that aggregation data requested by a data request associated with the aggregation operation is stored in the cache to bypass retrieval of the aggregation data from a data storage.

Example 19 includes the at least one computer readable storage medium of any one of examples 14 to 18, wherein the instructions, when executed, further cause the computing system to retrieve, with a host processor, the subset of nodes, compress, with the host processor, the subset of nodes to generate compressed nodes, receive, with the hardware accelerator, the compressed nodes, and decompress, with the hardware accelerator, the compressed nodes to obtain the subset of nodes.

Example 20 includes a method comprising determining, with a neural network, that a first eviction node stored in a cache will be evicted from the cache based on a cache policy, wherein the first eviction node is part of a plurality of nodes associated with a graph, wherein a subset of nodes of the plurality of nodes remain in the cache after the eviction of the first eviction node from the cache, tracking a number of cache hits on the cache during an aggregation operation associated with a hardware accelerator, and wherein the aggregation operation is executed on the subset of nodes that remain in the cache after the eviction of the eviction node from the cache, and executing a training process on the neural network to adjust the cache policy based on the number of the cache hits.

Example 21 includes the method of example 20, wherein the training process is a reinforcement learning process that includes generating a reward based on the number of cache hits, and adjusting the cache policy based on the reward.

Example 22 includes the method of any one of examples 20 to 21, further comprising identifying a state of cache lines of a set of the cache, wherein the state identifies for each respective cache line of the cache lines, a first number of accesses to the respective cache line, and a second number of accesses that were issued to the set after the respective cache line was last accessed, and identifying a second eviction node stored in a first cache line from the cache lines to evict based on the state.

Example 23 includes the method of example 20, further comprising identifying a cache miss during the aggregation operation, generating a reward based on the cache hits and in response to the cache miss, and executing the training process in response to the cache miss, wherein the training process is a reinforcement learning process, wherein the training process includes an update to weights of the neural network based on the cache hits.

Example 24 includes the method of any one of examples 20 to 23, wherein each of the cache hits is associated with an identification that aggregation data requested by a data request associated with the aggregation operation is stored in the cache to bypass retrieval of the aggregation data from a data storage.

Example 25 includes the method of any one of examples 20 to 24, further comprising retrieving, with a host processor, the subset of nodes, compressing, with the host processor, the subset of nodes to generate compressed nodes, receiving, with the hardware accelerator, the compressed nodes, and decompressing, with the hardware accelerator, the compressed nodes to obtain the subset of nodes.

Example 26 includes a semiconductor apparatus comprising means for determining, with a neural network, that a first eviction node stored in a cache will be evicted from the cache based on a cache policy, wherein the first eviction node is part of a plurality of nodes associated with a graph, wherein a subset of nodes of the plurality of nodes remain in the cache after the eviction of the first eviction node from the cache, means for tracking a number of cache hits on the cache during an aggregation operation associated with a hardware accelerator, wherein the aggregation operation is executed on the subset of nodes that remain in the cache after the eviction of the eviction node from the cache, and means for executing a training process on the neural network to adjust the cache policy based on the number of the cache hits.

Example 27 includes the apparatus of example 26, wherein the training process is a reinforcement learning process that includes means for generating a reward based on the number of cache hits, and means for adjusting the cache policy based on the reward.

Example 28 includes the apparatus of any one of examples 26 and 27, further comprising means for identifying a state of cache lines of a set of the cache, wherein the state identifies for each respective cache line of the cache lines, a first number of accesses to the respective cache line, and a second number of accesses that were issued to the set after the respective cache line was last accessed, and means for identifying a second eviction node stored in a first cache line from the cache lines to evict based on the state.

Example 29 includes the apparatus of example 26, further comprising means for identifying a cache miss during the aggregation operation, means for generating a reward based on the cache hits and in response to the cache miss, and means for executing the training process in response to the cache miss, wherein the training process is a reinforcement learning process, wherein the training process includes an update to weights of the neural network based on the cache hits.

Example 30 includes the apparatus of any one of examples 26 to 29, wherein each of the cache hits is associated with an identification that aggregation data requested by a data request associated with the aggregation operation is stored in the cache to bypass retrieval of the aggregation data from a data storage.

Example 31 includes the apparatus of any one of examples 26 to 30, further comprising retrieving, with a host processor, the subset of nodes, compressing, with the host processor, the subset of nodes to generate compressed nodes, receiving, with the hardware accelerator, the compressed nodes, and decompressing, with the hardware accelerator, the compressed nodes to obtain the subset of nodes.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical, or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:
1. A computing system comprising:
a host processor;
a hardware accelerator coupled to the host processor; and
a memory coupled to the hardware accelerator, the memory including a set of executable program instruc- tions, which when executed by one or more of the host processor or the hardware accelerator, cause the computing system to:
determine, with a neural network, that a first eviction node stored in a cache is to be evicted from the cache based on a cache policy, wherein the first eviction node is part of a plurality of nodes associated with a graph, and wherein a subset of nodes of the plurality of nodes remain in the cache after the eviction of the first eviction node from the cache,
track a number of cache hits on the cache during an aggregation operation associated with the hardware accelerator, wherein the aggregation operation is executed on the subset of nodes that remain in the cache after the eviction of the first eviction node from the cache, and
execute a training process on the neural network to adjust the cache policy based on the number of the cache hits.

2. The computing system of claim 1, wherein the training process is to be a reinforcement learning process that includes:
a generation of a reward based on the number of cache hits, and
an adjustment of the cache policy based on the reward.

3. The computing system of claim 1, wherein the executable program instructions, when executed, cause the computing system to:
identify a state of cache lines of a set of the cache, wherein the state is to identify for each respective cache line of the cache lines, a first number of accesses to the respective cache line, and a second number of accesses that were issued to the set after the respective cache line was last accessed, and
identify a second eviction node stored in a first cache line from the cache lines to evict based on the state.

4. The computing system of claim 1, wherein the executable program instructions, when executed, cause the computing system to:
identify a cache miss during the aggregation operation,
generate a reward based on the cache hits and in response to the cache miss, and
execute the training process in response to the cache miss, wherein the training process is a reinforcement learning process, wherein the training process is to include an update to weights of the neural network based on the cache hits.

5. The computing system of claim 1, wherein each of the cache hits is associated with an identification that aggregation data requested by a data request associated with the aggregation operation is stored in the cache to bypass retrieval of the aggregation data from a data storage.

6. The computing system of claim 1, wherein the executable program instructions, when executed, cause the computing system to:
retrieve, with the host processor, the subset of nodes,
compress, with the host processor, the subset of nodes to generate compressed nodes,
receive, with the hardware accelerator, the compressed nodes, and
decompress, with the hardware accelerator, the compressed nodes to obtain the subset of nodes.

7. A semiconductor apparatus comprising:
one or more substrates; and
logic coupled to the one or more substrates, wherein the logic is implemented in one or more of configurable logic or fixed-functionality logic hardware, the logic coupled to the one or more substrates to:

determine, with a neural network, that a first eviction node stored in a cache is to be evicted from the cache based on a cache policy, wherein the first eviction node is part of a plurality of nodes associated with a graph, and wherein a subset of nodes of the plurality of nodes remain in the cache after the eviction of the first eviction node from the cache, track a number of cache hits on the cache during an aggregation operation associated with a hardware accelerator, wherein the aggregation operation is executed on the subset of nodes that remain in the cache after the eviction of the first eviction node from the cache, and execute a training process on the neural network to adjust the cache policy based on the number of the cache hits.

8. The apparatus of claim 7, wherein the training process is to be a reinforcement learning process that includes:

a generation of a reward based on the number of cache hits, and an adjustment of the cache policy based on the reward.

9. The apparatus of claim 7, the logic coupled to the one or more substrates is to:

identify a state of cache lines of a set of the cache, wherein the state is to identify for each respective cache line of the cache lines, a first number of accesses to the respective cache line, and a second number of accesses that were issued to the set after the respective cache line was last accessed; and identify a second eviction node stored in a first cache line from the cache lines to evict based on the state.

10. The apparatus of claim 7, wherein the logic coupled to the one or more substrates is to:

identify a cache miss during the aggregation operation;

generate a reward based on the cache hits and in response to the cache miss; and execute the training process in response to the cache miss, wherein the training process is a reinforcement learning process, wherein the training process is to include an update to weights of the neural network based on the cache hits.

11. The apparatus of claim 7, wherein each of the cache hits is associated with an identification that aggregation data requested by a data request associated with the aggregation operation is stored in the cache to bypass retrieval of the aggregation data from a data storage.

12. The apparatus of claim 7, wherein the logic coupled to the one or more substrates is to:

retrieve, with a host processor, the subset of nodes, compress, with the host processor, the subset of nodes to generate compressed nodes, receive, with the hardware accelerator, the compressed nodes, and decompress, with the hardware accelerator, the compressed nodes to obtain the subset of nodes.

13. The apparatus of claim 7, wherein the logic coupled to the one or more substrates includes transistor channel regions that are positioned within the one or more substrates.

14. At least one computer readable storage medium comprising a set of executable program instructions, which when executed by a computing system, cause the computing system to:

determine, with a neural network, that a first eviction node stored in a cache is to be evicted from the cache based on a cache policy, wherein the first eviction node is part of a plurality of nodes associated with a graph, and wherein a subset of nodes of the plurality of nodes remain in the cache after the eviction of the first eviction node from the cache;

track a number of cache hits on the cache during an aggregation operation associated with a hardware accelerator, wherein the aggregation operation is executed on the subset of nodes that remain in the cache after the eviction of the first eviction node from the cache; and execute a training process on the neural network to adjust the cache policy based on the number of the cache hits.

15. The at least one computer readable storage medium of claim 14, wherein the training process is to be a reinforcement learning process that includes:

a generation of a reward based on the number of cache hits, and an adjustment of the cache policy based on the reward.

16. The at least one computer readable storage medium of claim 14, wherein the instructions, when executed, further cause the computing system to:

identify a state of cache lines of a set of the cache, wherein the state is to identify for each respective cache line of the cache lines, a first number of accesses to the respective cache line, and a second number of accesses that were issued to the set after the respective cache line was last accessed; and identify a second eviction node stored in a first cache line from the cache lines to evict based on the state.

17. The at least one computer readable storage medium of claim 14, wherein the instructions, when executed, further cause the computing system to:

identify a cache miss during the aggregation operation;

generate a reward based on the cache hits and in response to the cache miss; and execute the training process in response to the cache miss, wherein the training process is a reinforcement learning process, wherein the training process is to include an update to weights of the neural network based on the cache hits.

18. The at least one computer readable storage medium of claim 14, wherein each of the cache hits is associated with an identification that aggregation data requested by a data request associated with the aggregation operation is stored in the cache to bypass retrieval of the aggregation data from a data storage.

19. The at least one computer readable storage medium of claim 14, wherein the instructions, when executed, further cause the computing system to:

retrieve, with a host processor, the subset of nodes;

compress, with the host processor, the subset of nodes to generate compressed nodes;

receive, with the hardware accelerator, the compressed nodes; and decompress, with the hardware accelerator, the compressed nodes to obtain the subset of nodes.

20. A method comprising:

determining, with a neural network, that a first eviction node stored in a cache will be evicted from the cache based on a cache policy, wherein the first eviction node is part of a plurality of nodes associated with a graph, and wherein a subset of nodes of the plurality of nodes remain in the cache after the eviction of the first eviction node from the cache;

tracking a number of cache hits on the cache during an aggregation operation associated with a hardware accelerator, wherein the aggregation operation is executed on the subset of nodes that remain in the cache after the eviction of the eviction node from the cache; and executing a training process on the neural network to adjust the cache policy based on the number of the cache hits.

21. The method of claim 20, wherein the training process is a reinforcement learning process that includes:

generating a reward based on the number of cache hits; and adjusting the cache policy based on the reward.

22. The method of claim 20, further comprising:

identifying a state of cache lines of a set of the cache, wherein the state identifies for each respective cache line of the cache lines, a first number of accesses to the respective cache line, and a second number of accesses that were issued to the set after the respective cache line was last accessed; and identifying a second eviction node stored in a first cache line from the cache lines to evict based on the state.

23. The method of claim 20, further comprising:

identifying a cache miss during the aggregation operation;

generating a reward based on the cache hits and in response to the cache miss; and executing the training process in response to the cache miss, wherein the training process is a reinforcement learning process, wherein the training process includes an update to weights of the neural network based on the cache hits.

24. The method of claim 20, wherein each of the cache hits is associated with an identification that aggregation data requested by a data request associated with the aggregation operation is stored in the cache to bypass retrieval of the aggregation data from a data storage.

25. The method of claim 20, further comprising:

retrieving, with a host processor, the subset of nodes;

compressing, with the host processor, the subset of nodes to generate compressed nodes;

receiving, with the hardware accelerator, the compressed nodes; and decompressing, with the hardware accelerator, the compressed nodes to obtain the subset of nodes.

* * * * *